(12) United States Patent
Montague

(10) Patent No.: US 11,710,172 B1
(45) Date of Patent: Jul. 25, 2023

(54) DYNAMICALLY PROVIDING CONTEXT-BASED NOTIFICATION AND FULFILLMENT

(71) Applicant: DoorDash, Inc., San Francisco, CA (US)

(72) Inventor: Jeffrey Montague, Oakland, CA (US)

(73) Assignee: DoorDash, Inc., San Francisco, CA (US)

( * ) Notice: Subject to any disclaimer, the term of this patent is extended or adjusted under 35 U.S.C. 154(b) by 153 days.

(21) Appl. No.: 17/231,989

(22) Filed: Apr. 15, 2021

Related U.S. Application Data

(63) Continuation of application No. 16/439,276, filed on Jun. 12, 2019, now Pat. No. 11,023,957.

(51) Int. Cl.
| | | |
|---|---|---|
| *G06Q 30/0601* | (2023.01) | |
| *G06Q 20/20* | (2012.01) | |
| *G06Q 30/0251* | (2023.01) | |
| *G06Q 20/32* | (2012.01) | |
| *G06Q 30/0204* | (2023.01) | |
| *H04W 4/029* | (2018.01) | |

(52) U.S. Cl.
CPC ....... *G06Q 30/0639* (2013.01); *G06Q 20/202* (2013.01); *H04W 4/029* (2018.02); *G06Q 20/3224* (2013.01); *G06Q 30/0205* (2013.01); *G06Q 30/0259* (2013.01); *G06Q 30/0261* (2013.01); *G06Q 30/0641* (2013.01)

(58) Field of Classification Search
CPC .......... G06Q 30/0641; G06Q 20/3224; G06Q 30/0205
See application file for complete search history.

(56) References Cited

U.S. PATENT DOCUMENTS

| | | |
|---|---|---|
| 9,269,103 B1 | 2/2016 | Kumar et al. |
| 9,811,838 B1 | 11/2017 | Daire et al. |
| 10,290,067 B1 | 5/2019 | Cronin et al. |
| 11,023,957 B1 | 6/2021 | Montague |
| 2017/0278062 A1* | 9/2017 | Mueller ............ G06Q 30/0631 |
| 2020/0265383 A1 | 8/2020 | Zhang |
| 2020/0333785 A1 | 10/2020 | Cooper |
| 2020/0410443 A1 | 12/2020 | Shapira |

OTHER PUBLICATIONS

U.S. Appl. No. 16/439,276, Examiner Interview Summary dated Jan. 22, 2021, 1 pg.
U.S. Appl. No. 16/439,276, Notice of Allowance dated Jan. 22, 2021, 32 pgs.

* cited by examiner

*Primary Examiner* — A. Hunter Wilder
(74) *Attorney, Agent, or Firm* — Kwan & Olynick LLP

(57) ABSTRACT

In some examples, a location of a merchant is updated as the merchant moves. A server receives the location of the merchant, and compares that location to the location of a user, so as to determine whether the merchant is located within a first threshold distance or a second, smaller threshold distance from the location of the user. If the user is within the first threshold distance, the server presents a first point of sale (POS) interface to initiate an order from the merchant and present the user with an option to fulfill that order through delivery. If the merchant is located within the second, smaller threshold distance from the user, the server presents the user with a second POS interface that gives the user an option to fulfill the order through pickup instead of delivery.

20 Claims, 14 Drawing Sheets

DYNAMICALLY PROVIDING CONTEXT-BASED NOTIFICATION AND FULFILLMENT

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Food trucks and other mobile merchants and service providers are common in urban areas. While some mobile merchants have a set schedule of travel, others make travel decisions on an ad-hoc basis, such that a merchant has an irregular or flexible location, business hours, and/or menu or inventory. Traditionally, customers who wish to patronize and/or make a purchase from a mobile merchant physically visit the merchant's location to finalize a purchase, process payment, and pick up their order. In some cases, the customer tracks a merchant's location with a search targeted toward news that is broadcast by the specific merchant (e.g., through Twitter, Facebook, or another social media platform). In the alternative, the customer may seek out a third-party app or website that may aggregate the locations of several food trucks, typically from social media (e.g., Twitter), through manual location information provided by the merchant, or by accessing GPS data broadcast from the merchant.

BRIEF DESCRIPTION OF THE DRAWINGS

The above and other features of the present disclosure, its nature and various advantages will be more apparent upon consideration of the following detailed description, taken in conjunction with the accompanying drawings in which.

Figure 1:
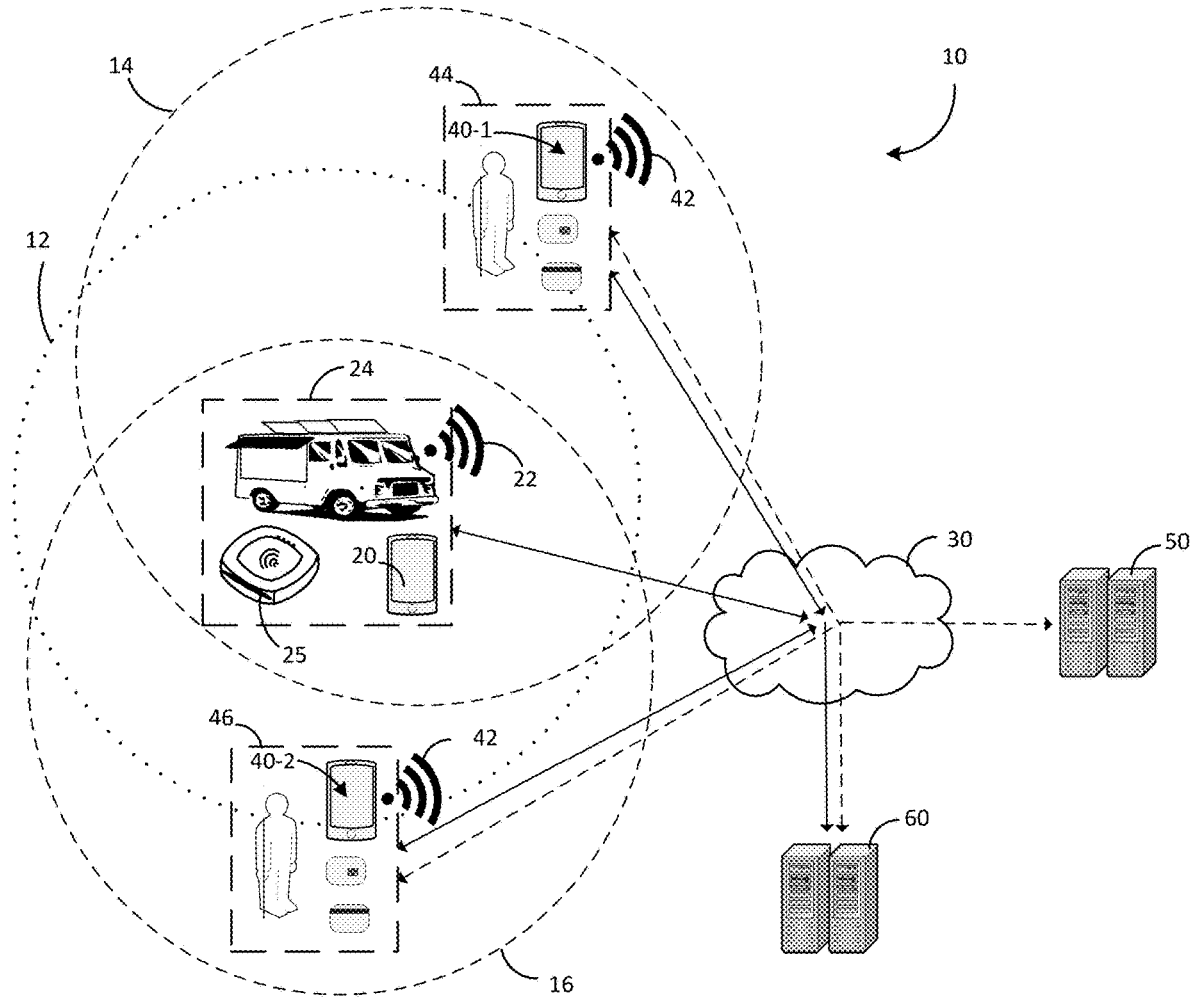
FIG. 1 is a diagram of an environment configured to dynamically generate different order fulfillment options for differently-located customers and/or merchants in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The present disclosure relates to systems and methods for dynamically determining whether and how to provide notification to a customer of a changeable remote location of a merchant, and fulfillment options for vending products from that merchant to a customer. In one embodiment, a network of one or more merchants offers products for sale via a common application or interface that communicates with a third party server. In some embodiments, some or all of the merchants in the network are mobile in nature, so as to move from location to location. In some embodiments, a merchant may be or may include a mobile arm of a brick and mortar business, such as a food truck, and/or merchant installations at farmer's markets, trade shows, carnivals, fairs, or other gatherings of mobile merchants, or the like.

In one embodiment, the methods and systems described herein create respective virtual spaces (virtual representations of geographic boundaries, e.g., geo-fences or the like), around either or both of the merchant device and a customer device (or more than one device). A notification of proximity between the merchant and the customer is sent to the customer device or merchant device when either device enters the virtual boundary of the other device. The notification may be displayed on the customer device in a manner that allows the customer to see the identity of the merchant and/or their products, and to make a purchase for later pick up or delivery. In a similar manner, the merchant device may receive appropriate notifications of relevant customers in a merchant's proximity. In some embodiments, the virtual boundary may a geo-fence that bounds a geographic area around a particular device. In some embodiments, the virtual boundary may be drawn (or set) with consideration of other contextual factors, such as past purchases, a customer's indicated interest, a merchant's route, a merchant's intended marketing plan, or any other appropriate factor that may provide contextual information regarding the users within the geographic area in which the merchant intends to travel. The virtual boundary around the merchant device and/or the customer device may, in some embodiments, be set to a predetermined threshold size, or may be dynamically customized in size and shape based on the merchant's route of travel, the geographic location of the boundary, the population density of the relevant location, the time of day, the type or quantity of the product offered for sale, the operational capacity of the merchant, and/or other appropriate factors.

In another embodiment, the methods and systems described herein send a notification of proximity of a merchant to a customer based not only on proximity between the customer device and the merchant device, but also (or in the alternative), based on a determined level of interest of the customer in the products offered by the merchant. This determination may be based on a user's previous purchases or actions, current conditions (like time, weather, or traffic), merchant saturation indicators in the target area(s), customer interest indicators (e.g., a preference in cuisine or price range) provided by the customer or obtained from a third-party system, and the like. In some embodiments, a determination of customer interest may be predictive, deterministic, and/or based on a classification of users in accordance with one or more user characteristics.

In one embodiment, the disclosed methods and systems send the notification of relevance (based on proximity, time, customer or merchant preferences, etc.) of the merchant to the customer in a manner that provides access to a point of sale (POS) interface, via which the customer can order, purchase, or reserve one or more products from the merchant. In various embodiments, payment may be processed prior to or after picking up the product. The POS interface may allow for the intake of payment information and the authorization and processing of payment information by a remote financial institution, card issuer, or other third-party payment system. Alternate embodiments are also contemplated where an opposite flow is implemented, that is, notifications of customers are provided to a merchant, such notifications happening additionally or alternately to notifications to customers. In such embodiments, notifications to one or more merchants may happen contemporaneously with, serially to, or otherwise at a separate time from notifications made to customers.

In some embodiments, before or after completing a purchase (e.g., by submitting payment information and/or authorizing payment), the disclosed methods and systems present a customer with a set of one or more fulfillment options. Additionally or alternatively, the methods and systems may re-compute the proximity between the customer and merchant as part of the determination of the fulfillment options available to the customer. These fulfillment options may include the option to pick up from the mobile merchant and/or the option for delivery by the merchant or via third-party courier, among others. The set of fulfillment options may be dynamically determined based on proximity (e.g., based on a threshold distance or range of distances) between the customer device and the merchant device, but need not specifically or approximately correspond to the virtual boundaries defined around the customer device and/or merchant device that relate to notification. For instance, in one embodiment, the boundary range around the merchant (into which the customer device falls) that is used for notification may be sub-divided into one or more concentric ranges. In some embodiments, different sets of fulfillment options are offered in each range. In other embodiments, the same or differing fulfillment options may be offered to a customer regardless of whether the customer falls within a notification range. Additionally or alternatively, the presentation of fulfillment options might include defining a preferred or suggested fulfillment option within the determined set.

In some embodiments, the disclosed methods and systems send, to a merchant device, a notification of relevance (e.g., based on proximity, time, customer or merchant preferences, etc.) of one or more customers, such notification being customizable to a particular subset of the merchant's customer base. In one such embodiment, a merchant-facing user interface may allow the merchant to identify one or more "loyal" customers, for example those who make repeated purchases from the merchant. A fulfillment server may then notify the merchant when the merchant moves to a location that is in proximity to one or more of those loyal customers. In one embodiment, the merchant-facing user interface may allow the merchant to issue a coupon, promotion, or advertisement to an identified subset of the merchant's customer base, or to otherwise interact with a set of proximate customers.

In another embodiment, the disclosed methods and systems compile and/or aggregate and present, to a merchant device, information regarding one or more customers. In one such embodiment, after a notification of proximity has been sent to customers, the customers who express interest in making a purchase may be determined. This information may be summarized and transmitted to the merchant. In some embodiments, prior to the transmission of a notification of proximity, information regarding the customers and/or their predicted interest in the merchant and its products (a customer profile), a selected location (a location profile), and/or current conditions (a condition profile), and the merchant themselves (a merchant profile) may be analyzed in order to generate location, route, and/or product recommendations to the merchant. In some embodiments, this recommendation or aggregated data may be presented to the merchant in a variety of forms, such as a dashboard or graphical format, or as a suggestion for one or more actions to be taken by the merchant, for instance a suggested location or route for sale of their products, or a suggested product that is predicted to be successful in a particular market or geographic area. In still other embodiments, this recommendation or aggregated data may be presented to the merchant as one or more heat maps representing "hot spots" of customer congregation, preference, or volume or ROI of sales, among other things.

In conventional solutions, a burden is placed on the customer to actively conceive of and search for information relating to merchants, potentially through multiple searches and on a variety of platforms with which a merchant directly or indirectly engages, each search targeted toward a distinct merchant. A customer's searches may indicate that one or more merchants are relatively remote from the customer, who may be uninterested in travelling to meet the merchant, resulting in the customer's wasted effort. Alternatively, the customer may be interested in purchasing a product with a finite supply (such as a certain type of meal), which supply may be exhausted or unavailable by the time the customer arrives at the merchant's location to finalize their purchase, leading to customer dissatisfaction.

Conversely, merchants may need to anticipate the locations at which they will be located and the products they will offer for sale. Because mobile merchants, like food trucks, are often limited in space, they may only be able to carry and offer for sale a limited range of products. In a conventional scenario where a customer wishes to purchase a product that is unavailable, scarcity or unavailability of a product results in the merchant's lost opportunity to make a sale. In scenarios where the merchant does have available a product of interest, they may still lose the opportunity for a sale where their selected location is too far from the interested customer.

The technology herein employs a plurality of computing devices, such as mobile devices, to provide targeted and automatic recommendations of merchants and/or products to customers based on proximity or other relevant context, without customers having to perform search or filtering of merchant's and/or their products. In some embodiments, the mobile devices (or a subset thereof) may have location-determining systems via which the locations of respective devices may be determined. Customers may also be introduced to a greater variety of merchants than they may otherwise have been aware of simply through their own targeted search.

As a further result of the technology described herein, there may be an interaction of multiple computing devices to expedite a fulfillment process by dynamically determining which of several fulfillment options (e.g., pickup, delivery, both) may apply given a changeable proximity between the merchant and the customer (e.g., a moving food truck), or overall network efficiency. Dynamic determination of fulfillment options may therefore be made as the location of the merchant is changed (that is, as the merchant, in a mobile vehicle, moves to a new location), without the need for a merchant or customer to manually analyze or determine the practicality of fulfillment at the time of the order. This technology may also provide a highly-customizable interface for specifying fulfillment options based on practical and/or conditional considerations, including merchant and customer preferences, current environmental and geographic conditions, the availability of transient or time-sensitive fulfillment options, such as third-party assistance, among other considerations. That is, the systems and methods described herein may also provide a way of determining real-time locations of one of more entities involved in the fulfillment or an order, and displaying a graphical user interface to any of a customer, a merchant, or a courier, that automatically provides an indicator of such real-time locations, and/or automatically provides, in dependency of such real-time locations, dynamic options for fulfillment of an order. By these means, the user customer, merchant, or courier is presented with an improved user interface for electronic devices. Further, the customer may be presented with a set of fulfillment options that can be efficiently met by a merchant and may select from that set, thereby mitigating reduction of merchant or customer satisfaction due to the selection of or default to less-preferred or inconvenient methods of fulfillment. Additionally, the systems and methods described herein further provide the ability to receive, via a user interface, a customer selection of an order, to determine, based on real-time location determining systems, locations of one or more mobile entities with changeable locations (such as merchant systems, customer systems, and in some embodiments third party systems such as couriers), and/or to automatically coordinate and monitor location-based fulfillment between the mobile entities. Still further, through the transmission and analysis of data communicated between the computing devices, valuable intelligence about customer interest and historical and predictive customer, merchant, and/or location profiles can be used to plan and optimize a mobile merchant's route of sale, inventory, and fulfillment management, thereby working to optimize merchant profit.

FIG. 1 depicts an example environment 10 configured to dynamically generate different order fulfillment options for differently-located customers, in accordance with an embodiment of the present disclosure. As illustrated, environment 10 may include one or more merchant systems 24. Any number of merchant devices 20 may be operated by a single merchant or multiple merchants, however, for ease of illustration, a single merchant system 24 with a single device 20 is illustrated in FIG. 1. In the illustrated embodiment, a merchant is a mobile merchant (meaning, in an exemplary embodiment, that the merchant has mobility to move from place to place) with a mobile device 20 carried, conveyed, or installed on a mobile vehicle operated by a merchant, such as a food truck. That is, because the merchant is mobile, the location of a merchant device 20 may be changeable as the merchant moves along a planned or ad hoc route. In other embodiments, merchant system 24 may be located at any mobile or stationary position. That is, the merchant may be stationary for a temporary period of time (for example where a food truck is stopped or parked). Further, in some embodiments, a merchant's mobile device 20 may located within be a brick and mortar location of the merchant, in which case the device may be stationary or movement of the device may be limited (e.g., to within a building). Merchant system 24 may include a device 20 such as a mobile phone such an iPhone or Android device, an iPad or tablet device, a laptop, or touchscreen device, though any practical device that can communicate with the network 30 may be appropriate. In the embodiment of FIG. 1, merchant system 24 includes a payment reader 25 illustrated as a standalone mobile hardware device, though the configuration is not so limited. In other embodiments, the payment reader 25 may be integrally incorporated into the merchant device 20, for instance where the merchant device 20 is a smart phone (iOS or Android) or another computing device that is configured to act as an embedded card reader (ECR). In still other embodiments, reader 25 may be presented as software (such as an application installed on a mobile device), hardware, or any combination thereof in another component of environment 10. In some embodiments, merchant system 24 may also include a location-determination device 32, such as a device transmitting a beacon or signal, a GPS transmitter/receiver, or another device that may be used to determine a location of the merchant device with respect to other devices.

The term "merchant" (also referred to herein as a vendor, seller, or in some exemplary embodiments, a food truck or restaurant) may be understood to encompass any business or other entity that sells, leases, or otherwise provides physical goods or services to one or more customers. For purposes of explanation, one type of merchant may be a restaurant or food service provider, though of course, any type of business or combination of businesses may be possible in different embodiments. In one exemplary embodiment, a merchant is a mobile merchant, such as a food truck, that offers for sale physical goods to customers that makes those goods available at a mobile (e.g., moveable) location. The merchant may offer a variety of fulfillment options, such as delivery or pickup, among others. The merchant may use merchant device 20 (such as a mobile device) to create, complete, supplement, or augment a comprehensive point-of-sale (POS) system implemented by the merchant and presented to a customer to facilitate a sales transaction. In some embodiments, this POS system may include or be used in correspondence with payment reader 25 to receive payment data from a payment card or device. In other embodiments, the merchant's POS system may involve the use of one or more computing components of fulfillment server 50, in a manner described in greater detail below.

As illustrated, environment 10 may include one or more customers systems 44 and 46 whose associated customers may operate customer devices 40-1 and 40-2, respectively. While devices 40-1 and 40-2 are illustrated as two separate devices, they may be generally understood to function relatively similarly, and any of the customer devices may be referred to herein, individually and collectively, as a customer device 40 for ease of reference). A customer device 40 may be any device operated (or operable) by a customer that is able to communicate with the merchant device 20 and a central server 50 (described further herein) via the network 30. The term "customer" (also referred to herein as a "user" (of a POS system), a "purchaser" or the like) may be any individual or entity that may purchase or intend to purchase a product or service of a merchant, or may be potentially interested in purchasing a product or service of a merchant. A customer device 40 may be, for instance, a mobile phone such as an iPhone or Android device, an iPad or tablet device, a laptop or touchscreen device, a PC or stationary computing device, or any other practical device that can communicate via the network 30. In an exemplary embodiment, customer device 40 may also be capable of taking in payment information related to a payment device (e.g., a device that is capable of communicating with one or more interfaces of payment reader 25, such as a card having a magnetic strip or having an EMV chip (e.g., a credit or debit card, a gift card, a proxy card associated with at least one financial account, etc.), or a NFC- or Bluetooth-enabled electronic device such as a smart phone running a payment application, though other types of payment devices may be used in other embodiments). In some embodiments, entry of payment information may take place through user input via a keyboard or keypad (whether mechanical, membrane, visual (displayed), tangible or intangible), stylus input, or touchscreen, through a saved or stored set of payment information, through an NFC or Bluetooth protocol (or similar), or any other known means. In some embodiments, a customer device 40 may also include a location-determination device 42, such as a device transmitting a beacon or signal (or, in other embodiments, a GPS receiver or another type of device) that may be used to determine a current location of the customer device. A customer location may be relatively stationary (e.g., when the customer is at home, at work, at an event, in a building, etc.) or changeable (when the customer is traveling or being conveyed, e.g., by foot or vehicle), or any combination of the two. In one embodiment, a first customer device 40-1 is a mobile device, such as a smart phone, that changes location as the customer moves, while a second customer device 40-2 is a relatively stationary device, such as a PC installed in a home or workplace, where the location is unlikely to change in a short period of time. In other embodiments, both of customer devices 40-1 and 40-2 may variously be mobile or stationary.

It will be understood that while, for illustrative purposes, FIG. 1 depicts one merchant device 20, one payment reader 25, and two customer devices 40-1 and 40-2, the environment 10 is not so limited. In various implementations, any number of merchant devices and any number of customer devices may be used in any number of configurations. Further, payment reader 25 is not strictly necessary for the operation of the environment 10 or the merchant system 24. In embodiments where payment reader 25 is used, the reader may not necessary be used in a 1:1 correspondence with the merchant system 24, and rather, multiple payment readers may be used by a single merchant.

Environment 10 may also include one or more servers 50. A server 50 is, in some embodiments, remote to the merchant device 20 and customer devices 40 but is capable of transmitting and receiving information therewith via the network 30. In the embodiment of FIG. 1, remote server 50 is a mobile fulfillment server (also referred to herein as "fulfillment server") capable of processing and transmitting data to, from, and between merchant device 20 and customer device 40 to facilitate sales transactions in a manner described in greater detail below.

In the illustrated example of FIG. 1, the fulfillment server 50 determines the location of the merchant device 20 from information transmitted by the location-determination device 22, and the location of the customer devices 40-1 and 40-2 from their respective location-determination devices 42. As discussed below with respect to FIGS. 2-4, the fulfillment server 50, using the current location of a merchant's device 20 and/or stored information relating to the merchant's preferences, may define a virtual geographic boundary 12 around the merchant device 20 (boundary 12 being illustrated in FIG. 1 as a dotted line), which boundary is updated as the merchant's route and/or location changes. In addition, the fulfillment server 50, using the current location of a customer's device 40 and/or stored information relating to that customer's preference, may define a respective virtual boundary around each customer device 40. With reference to FIG. 1, boundary 14 (illustrated as a dashed line) surrounds customer device 40-1, and boundary 16 (illustrated as a dashed line) surrounds customer device 40-2, which boundary may change as the locations of the respective customer devices change. Each of the virtual boundaries 12, 14, and 16 may be understood to define an area (e.g., a geographic area) within which the respective device can be considered local or "proximate" to another device. That is, when a first device is located within (or, in some embodiments, partially within) the virtual boundary that surrounds a second device, the fulfillment server 50 determines that the first and second devices are proximate or near each other. By this method, the fulfillment server 50 tracks the location of merchant boundary 12 relative to each of the respective customer boundaries 14, 16, and determines when the merchant device 20 is in proximity to either customer. In the illustrated example of FIG. 1, boundary 12 intersects with both of boundary 14 and boundary 16, and therefore both of customer devices 40-1 and 40-2 are proximate to the merchant device 20. In other embodiments, proximity may be determined by, e.g., a determination that the location of merchant device 20 itself falls within boundary 14 or boundary 16, or any other measurement.

In some embodiments, fulfillment server 50 may, upon a determination of proximity with the merchant device 20, present to a customer device 40 a customer-facing user interface (e.g., a graphical user interface) that displays a notification of proximity to the merchant. In some embodiments, this notification may prompt the customer device 40 to transmit an indication of interest in making a purchase from (or otherwise interacting with) the merchant. In some embodiments, the fulfillment server 50 may then present to the customer device 40 a user interface through which the customer can purchase or order a product from the merchant; viz., fulfillment server 50 may provide one or more components of a POS system between the merchant and the customer. In some examples, fulfillment server 50 may transmit order information to the merchant device 20 via a merchant-facing user interface, email, instant messaging, or other type of electronic communication, or via voice, SMS, voicemail, or any other appropriate type of communication.

In other embodiments, fulfillment server 50 may provider one or more fulfillment options to a customer device 40 based on the customer device's location and/or its location relative to the merchant device 20. In the example depicted by FIG. 1, fulfillment server 50 may determine which of a plurality of proximity ranges the customer device(s) fall into with respect to the merchant device 20. For instance, customer device 40-1 may fall into a first proximity range with respect to the merchant device 20, while customer device 40-2, being a different distance from merchant device 20 than device 40-1, or being in a geographic area that may be impacted conditions that do not impact device 40-1 (e.g., driving distance, weather, traffic, density, etc.), may fall into a second proximity range. In some embodiments, the fulfillment server 50 may coordinate in advance with the merchant to determine different sets of fulfillment options (e.g., pickup, delivery by merchant, delivery by courier, etc.) available for each of the different sets of proximity ranges from the merchant device 20. The fulfillment server may then deliver different sets of data to each of the respective customers detailing fulfillment options specific (though not necessarily unique) to that customer. For instance, fulfillment server 50 may present to customer device 40-1, via a user interface, two fulfillment options: pickup and delivery, and may present to customer device 40-1, via a user interface, only one fulfillment option, e.g., one of pickup or delivery. By these means, different sets of fulfillment data are sent to different customer devices, based on the devices' location and/or other relevant factors (that is, other context data) described in greater detail below. In some embodiments, merchant device 20 and one or more of customer devices 40-1 and 40-2 may also transmit data directly to and between each other, for example, transaction data regarding an order made by the customer from the merchant, or message data regarding the status of an order or of fulfillment.

Fulfillment server 50 transmits and/or receives location data, notification data, fulfillment data, profile/preference data, etc. to/from one or more of the merchant device 20 and the customer devices 40-1 (belonging to customer 44) and 40-2 (belonging to customer 46). These types of data transmission, performed over the network 30, are illustrated in FIG. 1 as solid lines passing through network 30. Network 30 may include one or more of any appropriate network, including a wide area network (such as the Internet), a local area network (such an intranet), a cellular network or another type of wireless network, such as Wi-Fi, Bluetooth, Bluetooth Low Energy, and/or other close-range wireless communications, a wired network, such as fiber optics and Ethernet, or any other such network, or any combination thereof. Although network 30 may be any suitable communication network, in one embodiment, network 30 may be the Internet and payment and information may be communicated between system components in an encrypted format such by a transport layer security (TLS) or secure socket layer (SSL) protocol. In addition, when the network 30 is the Internet, the components may use the transmission control protocol/Internet protocol (TCP/IP) for communication.

Environment 10 may also include, in some embodiments, one or more payment servers 60 operated by any suitable entities, such as one or more banks of the merchant and/or customer (e.g., a bank server), a card issuer, a proxy financial system, or the like. In other embodiments, a payment server 60 may not itself be part of the environment 10, but may be capable of communication with one or more components of the environment 10, such as with fulfillment server 50, via the network 30. In such embodiments, fulfillment server 50 may receive payment data from a customer device 40, and may send that payment data (and transmissions related thereto such as authorization data) to the payment server 60. Fulfillment server 50 may then coordinate with the payment server 60 to process payment and transaction information and to determine whether a payment transaction between the customer and the merchant is authorized. In some embodiments, one or more of customer devices 40-1 and 40-2 may also transmit and/or receive data directly from the payment server 60. In the illustrated example, transmissions of this payment data between the customer devices 40-1 and 40-2, the fulfillment server 50, and/or the payment server 60, performed over the network 30, are illustrated as dotted lines passing through network 30. In alternate embodiments, payment server 60 may be omitted, and the functions of payment server 60 may be performed by the fulfillment server 50. The fulfillment server 50 may in some embodiments communicate payment status, or completion of payment, to the merchant device 20. The components of environment 10 therefore facilitate electronic transactions between a merchant and a customer.

Figure 2A:
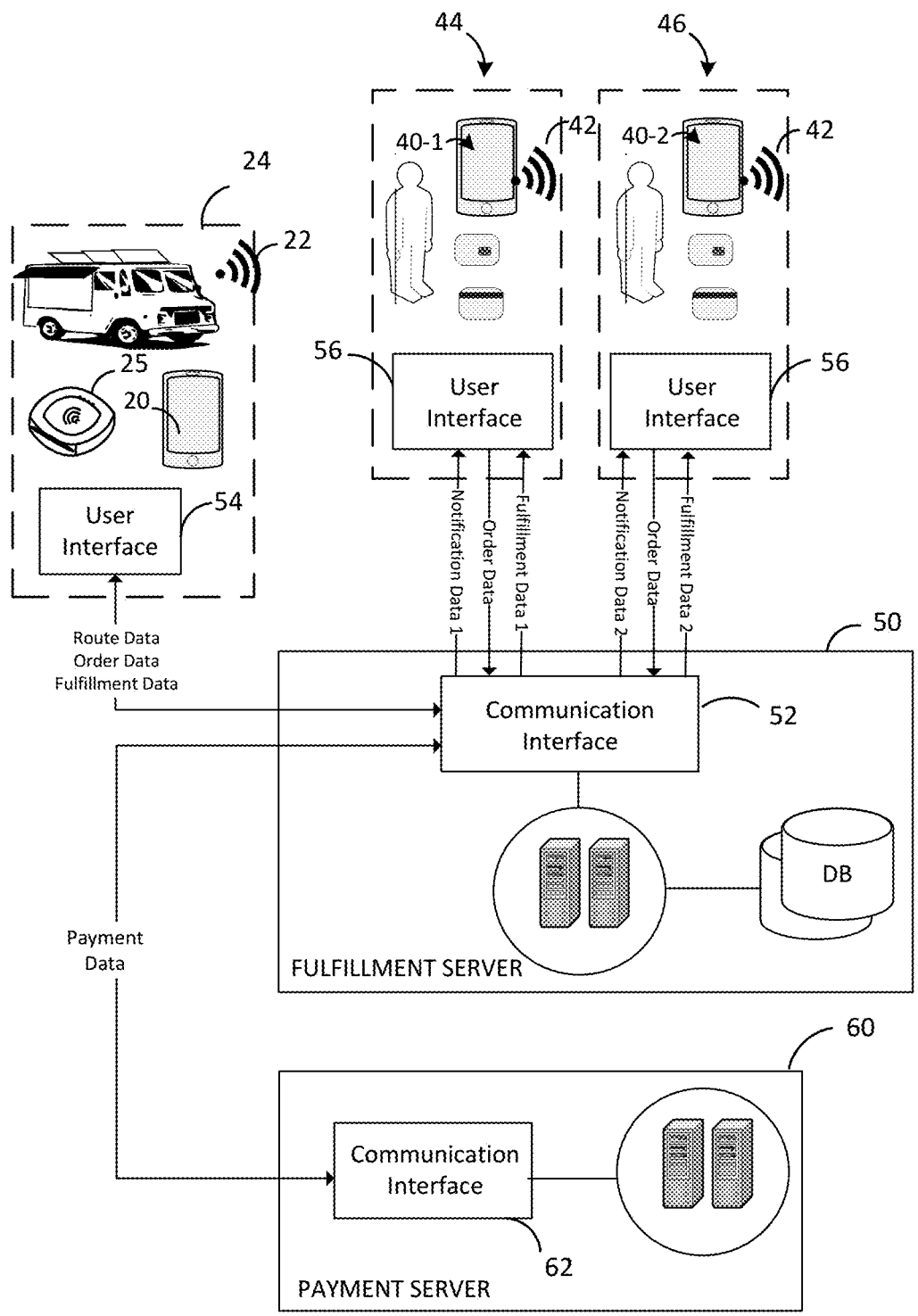
FIGS. 2A and 2B illustrate select components of a merchant device, user devices, a fulfillment server, and a payment server in accordance with some embodiments of the present disclosure.

FIG. 2A illustrates select components of the merchant device, user devices, fulfillment server, payment server of the environment 10 in accordance with an embodiment of the present disclosure. As illustrated in FIG. 2A, both merchant device 20 and customer devices 40 may transmit data to and receive data from fulfillment server 50. In one instance, the merchant and customer devices may transmit context data to the server, where context data includes information that provides contextual facts about the merchant(s) and/or the customer(s), such as their preferences, their historical actions, their location, or other appropriate information. Context data may take the form of, for example, location data indicating a respective location of the device. As another example, context data may be collected from one or more of location data, purchase data indicating purchases associated with those devices, a customer's indicated interest in the merchant and/or its products, a merchant's route, a merchant's intended marketing plan, and so on. In other embodiments, fulfillment server 50 may itself pull such context data from one or more of the merchant and customer devices 20, 40, or may determine such data from other third party sources. For instance, fulfillment server 50 may in some embodiments track the location of the merchant device 20, and the customer devices 40, and may transmit such tracking data to the other devices connected to network 30 as appropriate. In other instances, the fulfillment server 50 may wait to receive such information from the devices themselves.

In one exemplary embodiment, merchant system 24 may include a location-determination device 22 (e.g., in device 20), which may be a device that transmits a beacon or other signal or another device (in some embodiments, a GPS receiver) that may transmit to the fulfillment server 50 a current location of the merchant device 20. Through such location (e.g., geolocation), the location of the merchant device, and therefore the location of the merchant, may be determined to a desired degree of specificity, which may be general (such as a defined city neighborhood, a predetermined physical or logical area corresponding to an area of a city) or highly granular (such as a street address or intersection, a particular physical distance (within a mile, within a calculable number of meters), or any other appropriate value). The location of the merchant device 20 may additionally or alternately be determined using satellites, telecommunication towers, manual or map-based identification by a user of the device, or any similarly-functional techniques. In other embodiments, where payment reader 25 is used and is connected to or otherwise at the same relative location as the merchant device 20, the payment reader 25 may include a location-determination device capable of determining the location of the reader 25, which location may be used as the location of the merchant device 20. In an exemplary embodiment, the location information of the merchant device 20 may be requested by and transmitted to the fulfillment server 50 via communication interface 52. The transfer of location data can be an inactive process performed by the merchant, and occur in the background of the normal operation of the merchant device 20, though embodiments may exist where the merchant activates such transfer. The transfer of location data is performed, in some embodiments, in real time, or alternatively, at predetermined times, upon predetermined conditions, or upon request by the fulfillment server 50, or by a merchant device 20 (e.g., manual transmission, or scheduled or triggered transmission by a clock component or other processing component of device 20). In other embodiments, it may be triggered by the merchant's use of, e.g., an application or location-based component on the device 20 (such as logging into or opening an app). Other methods of transmission are possible in other embodiments.

A customer using a customer device 40-1 or 40-2 (collectively, 40), such as a mobile device, may also have a detectable location, such location being knowable or calculable through the entry of customer data and/or the transmission of a location-determination component 42 located in a customer device, such as via a beacon or another similarly-functioning component to transmit a signal (or in other embodiments, a GPS receiver), in the manner and to the degree discussed above with regard to the merchant system 24. The location of the customer device 40 may be additionally or alternately be determined using satellites, telecommunication towers, manual or map-based identification by a user of the device, or any similarly-functional techniques. Also, in a manner similar to that discussed above with regard to merchant system 24, the location of the customer device 40 may be requested by and transmitted to the fulfillment server 50. In some embodiments, transmission by the customer device 40 may be scheduled or periodic, and in other embodiments, it may be triggered by the customer's use of, e.g., an application or location-based component on the device 40 (such as logging into or opening an app), though other methods of transmission are possible in other embodiments.

Merchant device 20 may communicate with the fulfillment server 50 via a merchant-facing user interface 54, such as a graphical user interface. Similarly, customer devices 40-1 and 40-2 may communicate with the fulfillment server 50 via respective customer-facing user interfaces 56. Fulfillment server 50 may present different types of data on the different user interfaces 54, 56. For instance, customer-facing user interface 56 may provide a POS interface (in some implementations, generated and/or delivered by the fulfillment server 50), through which a customer can select for purchase or order one or more items that the merchant has offered for sale. Customer-facing user interface 56 may also present a POS interface through which a dynamically generated set of order fulfillment options (or, e.g., one or more "best" or preferred fulfillment options) is presented, such options being specific to the customer based on, e.g., the location information of the customer transmitted by location-determination component 42 located in the customer device and/or the location information of the merchant transmitted by the location-determination component 22 located in the merchant device 20. The customer-facing user interface 56 may also allow for the intake of the customer's selection of a fulfillment option. Of course, many other types of information can be displayed or presented to a customer, in order to facilitate his ability to order from one or more merchants 20.

Merchant-facing user interface 54 (in some implementations, generated and/or delivered by the fulfillment server 50) may be used to present, on the merchant device 20, data regarding a customer's order, as well as data regarding aggregate characteristics or actions of customers, location, route data, and the like. Merchant-facing user interface 54 may also be used to intake data from a merchant, such as location data, route data, inventory data, price data, confirmation/cancellation data, and the like. The above descriptions are of course merely exemplary in nature, and different user interfaces, whether graphical, text-based, or other, may be used to present various types of data to the devices so as to facilitate the systems and methods described herein. Some examples of the content displayed and collected via user interfaces 54, 56 are also described in greater detail below with respect to FIGS. 7-9.

User interfaces 54, 56 may be displayed on their respective devices through, for instance, one or more of a web browser, application, text message/alert, device-standard notification, or by any other technique that allows for the display of server-generated content on an electronic display of the devices 20, 40. The electronic display may be a screen, such as an LED screen, OLED screen, LCD screen, plasma screen, and/or touchscreen (e.g., capacitive or resistive touch display). The user interfaces 54, 56 may also allow for input of information via that screen and/or another input device (touch-sensitive components, keyboard, keypad, mouse, trackpad, text, voice call, passbook, wearable or peripheral devices, or any other known technique, whether implemented as software or hardware or any combination thereof.

Figure 2B:
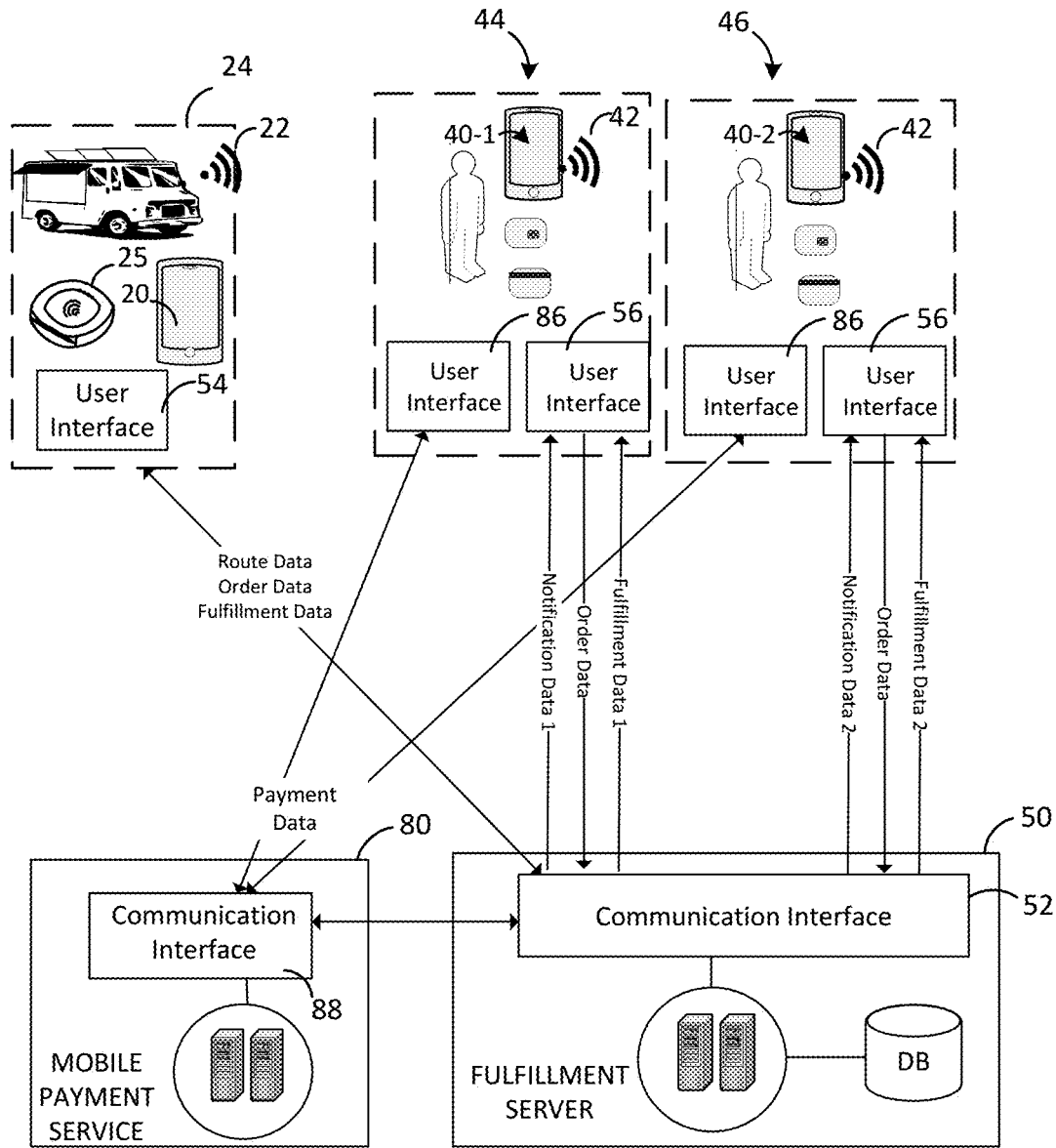

In an exemplary embodiment shown in FIG. 2A, the fulfillment server 50 may direct the customer to the customer-facing user interface 56, for example through the transmission of a push notification, such as an in-app location, an email, a text message, a voice message or phone call, or any other appropriate means of notification. In an alternate embodiment, a customer may be directed to the customer-facing user interface 56 from a corresponding or complementary application or webpage. For instance, an embodiment along the lines of that depicted in FIG. 2B may exist where the customer is a user of a mobile payment service 80 (including a communication interface 88) that facilitates the authorization of and processing of payment from one or more payment cards or accounts in a manner along the lines of the payment server 60 depicted in FIG. 1. Mobile payment service 80 may be, for instance, the provider of an intermediate application or software that provides access to a third party financial system, such as a card issuer system or the like. In alternate embodiments, mobile payment service 88 may be omitted, and the functions thereof may be performed by the fulfillment server 50. In the embodiment of FIG. 2B, a customer via a user interface 86 that facilitates communication with the mobile payment service 80 may be directed, by that interface 86, to a customer-facing user interface 56 that facilitates communication with the fulfillment server 50 in the manner along the lines of that described above and below with respect to FIG. 2A. In other embodiments, user interface 86 and user interface 56 may be encompassed by (or may be different components in) a single user interface displayed to the customer. In a case that a customer later initiates a purchase from the merchant through the customer-facing user interface 56 of the fulfillment server 50, the fulfillment server 50 may then direct the processing of the payment data relating to such purchase back to the mobile payment service 80 through user interface 86. Of course, various configurations are possible in different embodiments.

Figure 3:
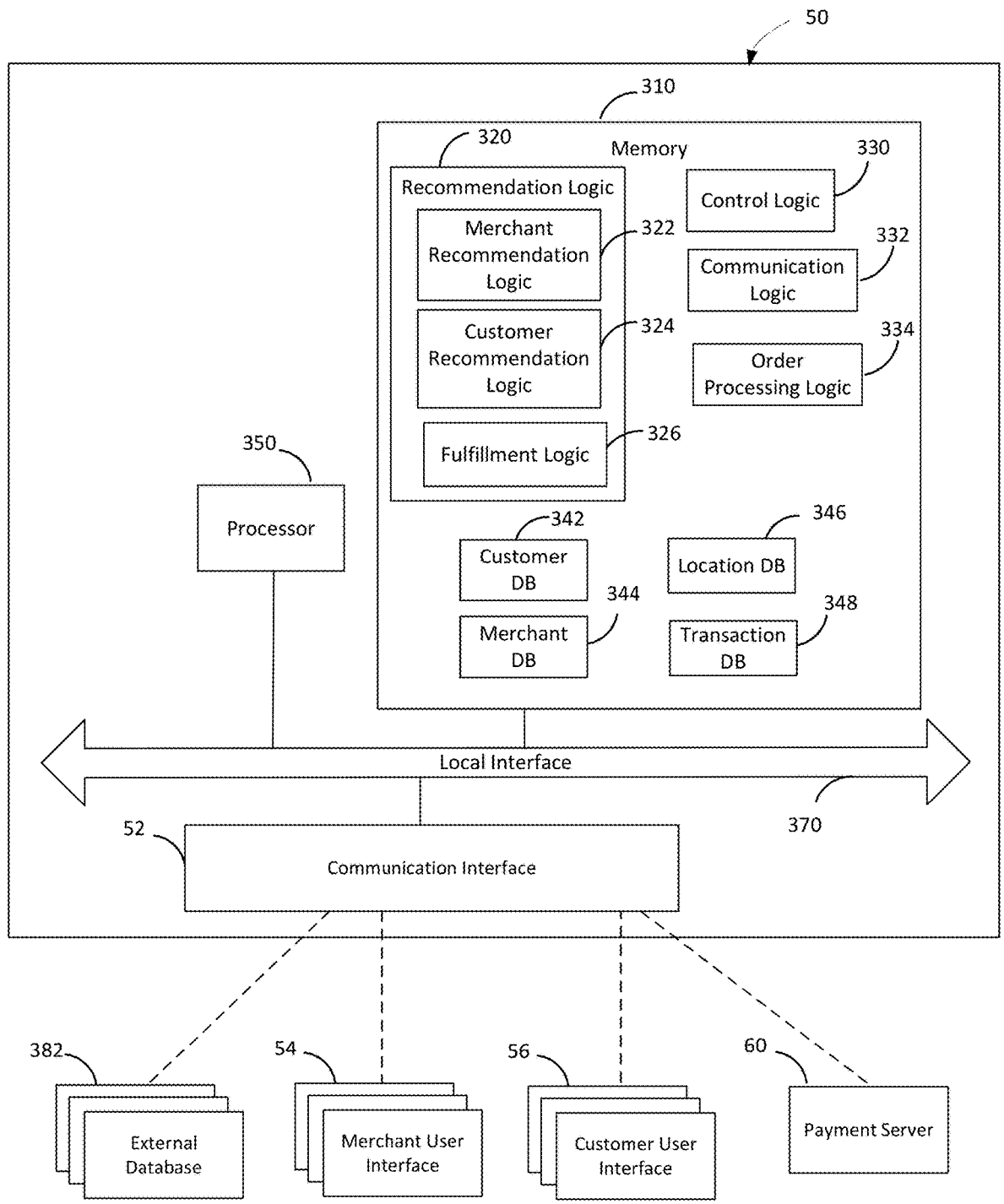
FIG. 3 illustrates select components of a fulfillment server in accordance with some embodiments of the present disclosure.

FIG. 3 illustrates select components of fulfillment server 50 in accordance with some embodiments of the present disclosure. The fulfillment server 50 may include a memory 310. As used herein, memory 310 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. Memory 310 may store instructions used in the systems and methods described herein. While FIG. 3 illustrates a single discrete memory 310, it will be understood that the embodiments described herein are not limited to any particular arrangement and that other embodiments may store information in one combined memory, or with information stored in a different configuration in one or more memories, some local to the other components illustrated in FIG. 3 and/or some shared with, or geographically located near, other computing systems. In one embodiment, the network environment includes a fulfilment server 50 further comprising a number of modules stored in memory 310, specifically, recommendation logic 320, merchant recommendation logic 322, customer recommendation 324, control logic 330, communication logic 332, and/or order processing logic 334. These depicted modules may variously represent one or more algorithms, computational models, decision making rules or instructions, or the like implemented as software code or computer-executable instructions (i.e., routines, programs, objects, components, data structures, etc.) that, when executed by one or more processors, program the processor(s) 350 to perform the particular functions of their respective logic. It may be understood that these modules are depicted in FIG. 3 as several discrete components, each labelled as an individual "logic", however, in various embodiments, the functions of each respective logic may be executable on their own or as part of one or more other modules; that is, any configuration of the depicted logical components may be used, whether implemented by hardware, software, firmware, or any combination thereof.

In the illustration of FIG. 3, memory 310 stores a recommendation logic 320, which may include a customer recommendation logic 322, including one or more algorithms or models for determining whether to notify a customer of a particular merchant's proximity, and a merchant recommendation logic 322, including one or more algorithms or models for determining one or more of a location, a time, and/or a route at which the merchant should sell their products, and/or to notify if a "preferred" and subscribed" customer is in proximity so the merchant can promote frequently purchased products. In addition, merchant recommendation logic may include algorithms or models to aggregate and analyze information for transmission to the merchant device 20. Recommendation logic 320 may also include a fulfillment logic 326, including one or more algorithms or models for determining a set of fulfillment options to present to a customer upon a customer's ordering from a merchant, based upon defined proximity ranges around the merchant device 20, among other factors. The capabilities of these various logics are described in greater detail below. In some embodiments, the recommendation logic 320 may be implemented in whole or in part as a machine learning system for achieving the functionalities described herein.

The fulfillment server 50 may include control logic 330, including one or more algorithms or models for generally controlling the operation of the fulfillment server 50. The memory 310 may also, in one embodiment, include communication logic 332, including one or more algorithms or models for obtaining information from or communicating information to one or more of the merchant device(s) 20, the customer devices 40, and/or payment server 60 via network 30 (FIG. 1). Furthermore, the fulfillment server 50 may have a communication interface 52 to exchange data with various components and/or devices on the network 30. For instance, communication interface 52 and communication logic 332 may be used (by, e.g., merchant recommendation logic 322, customer recommendation logic 324, or fulfillment logic 326, in the manner(s) described in greater detail below), to access data from one or more external databases 382 (through network 30), to transmit data from and/or to payment server 60, and to present or intake data via merchant-facing user interface(s) 54 and/or customer-facing user interface(s) 56. While communication logic 332 is illustrated as being a separate logical component, in an alternative embodiment, the fulfillment server 50 may include communication logic 332 as part of recommendation logic 320 or control logic 330. In another alternative embodiment, the communication logic 332 may communicate with third-party systems and/or may coordinate with the control logic 330 to read or write data to memory 310 or to another data repository (not shown) within the computing systems that make up the fulfillment server 50.

Memory 310 may be configured, in some embodiments, to include a customer database 342 that stores real-time and/or historic information and metrics related to one or more customers in relation to their profile and/or activity with the fulfillment server 50, such as the customer's name, contact information (e.g., email address, mailing address, telephone number, social networks), date of birth, payment card information (e.g., payment card number, expiration date, cardholder name, security code), customer account settings and/or preferences, and the like. In an embodiment, customer database 342 also stores a customer's location, transmitted from the customer device 40 via communication interface 52. Memory 310 may also include a merchant database 344 that stores real-time and/or historic information and metrics related to one or more merchants in relation to their profile, financial information, products, preferences, categories of products, costs, expiration dates, current inventory, and/or activity with the fulfillment server 50. In an embodiment, merchant database 344 also stores a merchant's location, transmitted from a location-determining component 22 of the merchant system 24 via communication interface 52. Still further, memory 310 may include a location database 346 that stores real-time and/or historic information and metrics related to one or more locations at which the merchant(s) may choose to sell their products and/or the customer(s) may choose to visit, such as known landmarks, buildings, addresses, types of locations, demographic information, local ordinances, traffic conditions and patterns, and the like. In addition, a transaction database 348 may be stored in memory 310, containing data relating to one or more purchase transactions between the customer and the merchant. The purchase transactions stored in transaction database 348 may be pending transactions and/or historic transactions, and the related transaction data may include any of, e.g., items purchased, categories of purchased items, time of purchases, frequency of purchases, financial exchange during purchase, fees, taxes, payment card information, etc. The various described logics stored in memory 310 may read data from or write data to any of the customer database 342, the merchant database 344, the location database 346, or the transaction database 348 as part of their respective processes.

In addition, in some embodiments, communication logic 332 may, in cooperation with the control logic 330, pull data relating to customers, merchants, locations, or other related data from public or private third-party records, independent from records managed by the merchant or customers. In one embodiment, the communication logic 332 may be used to crawl the web or known databases for publicly-accessible information. Publicly-accessible data may include, for instance, information about weather or traffic conditions, population density, business density, local business hours, business types, local ordinances, and the like. Similarly, third-party social media sites may provide similar information, as well as information about mobile, transient, or temporary businesses, events, street closures, and the like. It will be noted that while the term "database" or "repository" is used with reference to systems 342, 344, 346, and 348, these components are not so limited nor is any particular form or configuration of data storage mandated, and the described "databases" may alternatively be an indexed table, a keyed mapping, or any other appropriate data structure. The data stored in customer database 342, the merchant database 344, the location database 346, and/or the transaction database 348 are variously used, as described below, to provide relevant notifications of proximity to merchants and customers, to provide point of sale systems for customers to make a purchase from a proximate vendor, to determine an appropriate mode of fulfillment for a customer order, and/or to provide aggregated information to guide the merchant to targeted locations, among other things. The use of stored data in each of these functions is described in greater detail below.

As discussed above, in one exemplary embodiment, a merchant is a mobile merchant, such as a food truck, and the location of merchant device 20 may therefore be changeable as the food truck moves and relatively stationary when the food truck is parked for operation. A customer location may also be relatively stationary (e.g., when the customer is at home, at work, at an event, etc.), changeable (when the customer is traveling or being conveyed, e.g., by foot or car), or any combination of the two. In an exemplary embodiment, customer recommendation logic 324 may function to create a virtual boundary (that is, a logical boundary) around a merchant device 20, representing a geographic area close enough to the merchant device 20 that the merchant is willing and able to serve a customer base therein, and a respective virtual boundary around each customer device 40, representing a geographic area close enough to the customer device 40 that the customer may be prompted to make a purchase from a merchant within that area. A notification of proximity may be sent to a customer device 40 when a virtual boundary around a merchant device 20 overlaps with a virtual boundary around that customer device 40, which overlap may be triggered by the movement of either the merchant device 20 or a customer device 40, or both. Where, for example, a merchant device 20 moves into the respective virtual boundaries of multiple customers, all or a subset or those proximate customers may be notified. The selection of which customers to notify is performed, in an exemplary embodiment, by the customer recommendation logic 324.

Customer recommendation logic 324 may consider a variety of factors to narrow or filter out a set of customers to notify from a larger set of customers that are proximate to the merchant. For example, the total number of potential customers in proximate range of a single merchant may be in the hundreds or thousands, based on the density of people in the merchant's location at the moment proximity is determined. In an exemplary embodiment, the customer recommendation logic 324 may determine whether the potential customers in proximate range are large in number, for example, whether the number of potential customers exceeds some predetermined threshold value. In such scenarios (e.g., where the threshold is exceeded), customer recommendation logic 324 may intelligently filter that large set of potential (viz., proximate) customers, to target only "high-interest customers," that is, those customers whose patterns of interest and purchases, taken into consideration with the current market considerations, indicate that they might be interested in making a purchase from the merchant at (or soon after) the time proximity is determined. In its determinations, customer recommendation logic 324 may access and/or analyze data stored in the customer database 342, e.g., a user's historical actions (such as whether the customer has purchased before from this merchant or similar merchants, or the total amount typically spent by the customer), and/or customer profile information (such as an indicated preference in the merchant's cuisine or price range, or in the merchant themselves). The customer recommendation logic 324 may also consider current conditions independent from the customer, such as the timing of the notification, weather or traffic (typically obtained from a third-party weather or traffic source and stored in external database 382), or merchant operational limitations (e.g., the number of customers that the merchant is capable of serving, the time in which the merchant is capable of fulfilling orders, or the merchant's remaining inventory). Still further, customer recommendation logic 324 may consider information in merchant database 344 that is not specifically tied to the particular target merchant. That is, merchant database 344 may contain location information for other merchants that are positioned near to the current location of the merchant device 40, from which the similarly of the merchants (e.g., similarities in genre, cuisine, product offerings, price, etc.) may be determined. The concentration and/or similarity of merchants may indicate a degree of merchant saturation in the relevant area of proximity, where the interest of prospective customers may be potentially lowered if the saturation is too high. Further, the customer recommendation logic 324 may in some embodiments consider other external information (obtained via communication interface 52 from one or more external databases 382) that may be relevant to customer interest. As an example, customer recommendation logic 324 may refer to a third-party database or website to determine whether a target customer has followed or communicated regarding a merchant or product over social media, whether a merchant (or a similar merchant) or product is newly-offered or otherwise popular or trendy, or similar considerations that may indicate a higher or lower level of customer interest.

In an exemplary embodiment, the determination of customer interest by customer recommendation logic 324 may be predictive in nature, and may use one or more machine learning algorithms trained on historic customer and/or market trends. In other embodiments, customer recommendation logic 324 may consider the information above in a deterministic algorithm. In yet another embodiment, customer recommendation logic 324 may classify customers based on a subset of the factors discussed above, such as one or more customer-entered preferences, a customer's history of purchases and/or searches, or other appropriate information. As part of this classification, customer recommendation logic 324 may divide a set of proximate customers into logical buckets (or groups), each bucket being defined by one or more features shared in common by the customers within the bucket, and may assign different buckets to different reflect different levels of customer interest.

In one embodiment, after a notification of proximity has been sent, customer recommendation logic 324 may present to a customer device 40, via customer-facing user interface 56, one or more POS components (such as interactive screens) through which the customer owner of the device 40 may initiate a purchase or may otherwise interact to express interest in or feedback about the merchant, the merchant's location, and/or the merchant's products, separate from (or, in some embodiments, alongside with) making a purchase. Data representing the initiation of a purchase or the submission of such interest or feedback indicators may collectively be called "interest data," which may be used by the customer recommendation logic 324 as information representative of a customer's interest in the merchant and suggestive of the customer's likelihood in making a future purchase or encouraging purchases by others. Customer recommendation logic 324 may then act to aggregate interest data, collected from multiple customers, and to present the aggregated data to the merchant device 20, via the merchant-facing user interface 54. In some embodiments, the interest data may be presented to the merchant in association with certain relevant characteristics about the customers (such as, e.g., a common location, or a common product of interest). The information presented on the merchant-facing user interface 54 may, in some embodiments, be historical or cumulative, to allow the merchant to track and analyze customer interest over time.

In other embodiments, upon the customer recommendation logic 324's sending notification(s) of proximity to customer devices 40 in the proximity of a merchant device 20, the merchant recommendation logic 322 may begin collection and aggregation of customer interest indicators in response to the notification. The collection by the merchant recommendation logic 322 may be done, in some embodiments, in addition to or in alternative to, the collection performed by the customer recommendation logic 324, each collection of information being used for relatively different purposes. While the customer recommendation logic 324 aggregates interest data solely for the selection of customers to target with notification data, the merchant recommendation logic 322 may use its aggregated data for the additional or alternate purpose of providing recommendations to the merchant device 20. This aggregated data may be sent in real-time or relatively real-time to the merchant, to allow the merchant to target their business to the specified customer interest(s). As an illustrative example, a food truck merchant may transmit an actual or intended location to the fulfillment server 50, which then transmits a notification of proximity to high-interest customers in the vicinity of the merchant. These customers may thereafter begin expressing interest (through, e.g., comment or purchase or other interaction recognizable by the fulfillment server 50) in the food truck's location and/or products. The food truck may use this information to change its hours at that particular location (extending/shortening), adjust its menu or inventory (making more or less of a desired product), or otherwise optimize its service. In one embodiment, the merchant recommendation logic 322, rather than transmitting the customer's expressions of interest themselves, transmits a recommendation based on such expressions of interest. As one example, merchant recommendation logic 322 may aggregate a number of users (e.g., by location or a user characteristic (with reference to a user profile stored in user database 342)) that interact with the proximity notification, may automatically generate a suggested geographic location for the merchant (e.g., the geographic location with the most concentration of interest) based on the aggregated value, and may transmit such suggested location to the merchant device. This suggested location may be relatively broad (a neighborhood or city) or relatively narrow (an intersection, building, or the like) in different embodiments. In an alternate embodiment, only one of customer recommendation logic 324 and merchant recommendation logic 322 may collect and aggregate interest data, and may instead store such data in the customer database 342 for use by both logics 322 and 324. In other embodiments, both the filtering action described above as being performed by the customer recommendation logic 324 and the recommendations based on customer interest, described above as being performed by the merchant recommendation logic 322, are performed by a single logical component, whether customer recommendation logic 324 or merchant recommendation logic 322, or any other component of fulfillment server 50 in different embodiments.

In another embodiment, prior to the transmission of a notification of proximity, information regarding the customers in a geographic area and/or their predicted interest in the merchant and its products may be analyzed by the merchant recommendation logic 322, so as to provide a recommendation to the merchant to effect the optimization of its business. With reference to FIG. 3, merchant recommendation logic 322 may pull data from a variety of data sources into a centralized data storage. In some embodiments, a temporary storage such as a cache may be used (not specifically shown), though any type of data storage (or any portion(s) of memory 310) may be used in different embodiments. FIG. 3 illustrates a number of data sources (external databases 382, customer database 342, merchant database 344, location database 346, and transaction database 348) from which one or more data profiles may be created by the merchant recommendation logic 322. These may include, in some embodiments, profiles containing data regarding one or more customers (a customer profile), regarding a selected location (a location profile), regarding current conditions (a condition profile), and/or regarding the merchant themselves (a merchant profile), though any type of number of profiles may be defined in different embodiments. These four exemplary profiles (or any subset thereof) may be analyzed by merchant recommendation logic 322, and such analysis may be formalized into one or more recommendations (which may be, for instance, an analysis, suggestion, or intelligence, or in some circumstances, a restriction or mandate) transmitted to the merchant.

More particularly, in some embodiments, prior to the transmission of a notification of proximity, merchant recommendation logic 322 may consider information from customer database 342. This information may include, for example, data about the customers and/or their predicted interest in the merchant and its products (based on, e.g., past ordering histories, customer-entered preferences, etc.). Merchant recommendation logic 322 may also access location database 346, containing information about a current or planned merchant location or a selected geographic location (e.g., density of foot traffic, street layout, saturation of other similar vendors, etc.). In addition, merchant recommendation logic 322 may access data from one or more external databases 382 (through network 30). These external databases 382 may be public information sources for data relating to current and historic conditions, such as current time and date, weather, traffic patterns, area events and business, local regulations and zoning, landmarks, buildings, addresses, transit delays, road closures, and other information that may impact both customer and merchant likelihood to visit or frequent a particular location. In addition, merchant recommendation logic 322 may consider data in merchant database 344, which contains data relating to both the particular active merchant and other merchants. For instance, the merchant recommendation logic may generate a merchant profile based on, e.g., real-time and/or historic information and metrics related to merchants, financial information, products, preferences, categories of products, costs, expiration dates, current inventory, and the like. The merchant recommendation logic 322 may compile and analyze these sets of data (or any subset thereof), weighting different factors more or less heavily in order to provide a targeted recommendation to the merchant. In some embodiments, the aggregated customer, location, and/or condition data is compared to merchant-side characteristics to facilitate recommendations. The determination of information to include in the customer, vendor, location and condition profiles by merchant recommendation logic 322 may be predictive in nature, and may use one or more machine learning algorithms trained on historic customer and market trends, the merchant's historic decisions and sales, and/or real-tie and historic public information along the lines of those types of data described above. In other embodiments, merchant recommendation logic 322 may consider the information above in one or more deterministic algorithms.

In some embodiments, in developing its recommendations for the merchant, the merchant recommendation logic 322 may most heavily weigh the alignment of customer interest and price point with the merchant's offerings in order to provide a suggested route or route guidance to a mobile merchant. However, in that same embodiment, merchant recommendation logic 322 may recognize the existence of, e.g., an event (e.g., a sports event or even a popular time of day/date) that would direct a large amount of foot traffic to a particular area, and may suggest an alternate route that mitigates the avoidance of the most known highly-interested customer area with the increased opportunity of a heavy foot-traffic area. In another embodiment, the merchant recommendation logic 322 may act in this manner to coordinate placement of multiple mobile merchants (through the transmission of recommended routes), for example to conform with local regulations on the number of mobile merchants that may frequent an area, or to place limits on or normalize the range and assortment of types of merchants that may otherwise congregate to the same area. For example, if several food trucks directed to the same cuisine were to congregate in the same area, they may compete with each other and reduce customer interest, whereas if a variety of cuisines are represented in a particular are, customer interest may improve generally, beneficially impacting all vendors in that area. Of course, this is just an illustrative example, and any particular implementation or outcome may be possible in different embodiments.

As an illustrative example, in some embodiments, merchant recommendation logic 322 may provide a recommendation of a particular route to be taken by a mobile merchant in order to optimize the merchant's sales. In one such embodiment, where a merchant is a mobile food truck, merchant recommendation logic 322 may consider the preferential cuisines of the customers in various area neighborhoods (data from, e.g., customer database 342), may identify the neighborhoods in which customer preferences most closely align with the meals offered by the food truck (data from, e.g., location database 346 and customer database 342), and may plan a route for the merchant food truck that incorporates some or all of those neighborhoods. This planned route may then be transmitted to the merchant via merchant-facing user interface 54.

Merchant recommendation logic 322 may also provide suggested guidance as to issues other than merchant routing. For example, the logic 322 may guide the direction of inventory for a particular geographic location, suggest particular fulfillment options, and the like, based on the information set forth above, as well as consideration of the abilities and limitations of the merchant's efficiencies. With regard to fulfillment (described in greater detail below), as just one potential example, merchant recommendation logic 322 may consider the relative costs of various fulfillment options and their impact on a particular merchant's return on investment. For instance, where use of third party delivery has an associated cost, merchant recommendation logic 322 may suggest limiting fulfillment to pickup, if cheaper, to maximize merchant profit. Additionally and alternatively, merchant recommendation logic 322 may consider, e.g., whether the merchant is able to efficiently handle high volumes of business, as well as the transportation metrics of the geographic areas of the merchant's route. In one example, where streets are dense or circuitous or traffic is heavy, it may be difficult to requisition couriers to perform third-party delivery. Of course, in other example embodiments, merchant recommendation logic 322 may use any appropriate weighting of any appropriate factor to reach its recommendation. Any fulfillment preferences or "best" fulfillment methods that result from such analysis may be stored in merchant database 344 for use by the fulfillment logic 326 (described in greater detail below).

In some embodiments, where a large number of purchases have been made specifying a delivery option as a fulfillment choice, merchant recommendation logic 322 may provide information with which the fulfillment logic 326 may facilitate the ordering/demand for couriers in a particular area. In some embodiments, the merchant recommendation logic 322 may present, via merchant-facing user interface 54, an intake interface to allow the merchant to engage a third-party delivery service to assist in fulfillment. In another embodiment, the intake interface may allow the merchant to, based on data sent from the system indicating a high volume of demand and/or a high percentage of delivery orders, pass a notification to one or more couriers within or proximate to the merchant geo-fence indicating that there may be increased opportunity for business at the location of the merchant device. Alternately, the notification to couriers may be handled by the fulfillment logic 326 without (or partially without) input from the merchant through the merchant-facing user interface 54, for example through the use of default or preset preferences, or through the determination of a "best", preferred, or most efficient service based on location information stored in the location database 346 and/or current weather and event data pulled from external database(s) 382. In still other embodiments, such notification to third-party courier services may involve the calculation of one or more optimum travel routes coinciding with hot spots of customer activity provided by one or more merchants.

The merchant recommendation logic's recommendations may be delivered to the merchant via the merchant-facing user interface 54. In some instances, the recommendations may be delivered only when the merchant intentionally interacts with the user interface (e.g., by navigating a web browser to particular page or by opening an app on their merchant device 20), however, in an exemplary embodiment, a recommendation (or a link or interface to access the recommendation) is pushed to the merchant device 20, e.g., by an app-based notification, an SMS, a phone call, a sound or visually-based alert or ping, or other type of information. In some embodiments, the recommendation is presented in the form of a text-based message, indicating, e.g., a suggested location or route, a suggested product or inventory, a warning or notification of a condition, a particular suggested consideration for order fulfillment, or the like. In some embodiments, the notification to the merchant device 20 may include a map of the suggested route and/or any detours to the merchant's previously planned route.

In another embodiment, the recommendation of a route or location may be presented to the merchant, via merchant-facing user interface 54, as a heat map in which areas of higher predicted customer interest are shown as "hotter" areas, and areas of lower potential interest are shown as "colder" areas. In some embodiments, the recommendation may be presented as an actual map with a drawn or supervised modifiable route, and may contain indications of traffic, street closures, and/or areas of particular customer interest, among other things. In still other embodiments, the recommendations may take the form of contact information for a third party resource that may assist in facilitating the merchant's operation (e.g., a third party courier service) or for a competing or complementary merchant that may be interested in coordinating business location and/or offerings.

At any point in time when a merchant is open for business (or is otherwise taking orders), whether or not proximity notification is presented to a customer, a customer may be prompted to make a purchase from the merchant. To this end, the fulfillment server 50 may also include an order processing logic 334 that may be executed to provide, at least in part, an order processing functionality. For example, the order processing logic 334 may receive order information from the customer device 40 (via the customer user interface 56), and may access merchant information in the merchant database 344 to charge the customer using customer device 40 for the items ordered (through the authorization and confirmation of payment information which payment server 384), and to transmit an order confirmation to the merchant device 20 (via merchant user interface 54). In some embodiments, the order processing logic 334 may also store information associated with each order into one or more of the merchant database 344 and the customer database 342.

After an order has been placed, fulfillment server 50 presents to a customer, via customer-facing user interface 56, one or more options to fulfill their order, such as pickup or delivery, such fulfillment options taking into consideration the preferences and restrictions of the merchant. To that end, recommendation logic 320 may include a fulfillment logic 326 for determining a set of fulfillment options to present to a customer upon a customer's ordering from a merchant, based upon defined proximity ranges around the merchant device 20, among other factors. The fulfillment process is described in greater detail below with reference to FIG. 5.

While, in the exemplary embodiment, each of recommendation logic 320, control logic 330, communication logic 332, order processing logic 334, and fulfillment logic 326 is depicted in FIG. 3 as part of fulfillment server 50, these components need not be so configured, and in other embodiments, other configurations of the various components, within fulfillment server 50 or distributed over one or more computing systems, are possible. Recommendation logic 320, communication logic 332, control logic 330, and order processing logic 334 may be variously implemented in software, hardware, firmware, or any combination thereof. In the exemplary embodiment of FIG. 3, the various logical components are implemented in software and are stored in memory 310. Note that these components, when implemented in software, can be stored and transported on any non-transitory computer-readable medium for use by or in connection with an apparatus (e.g., a microprocessor) that can execute instructions. In the context of this disclosure, a "computer-readable medium" can be any device or system that can contain or store a computer program for use by or in connection with an instruction execution apparatus, e.g., read-only memory, random-access memory, flash memory, hard disks, etc. 1*n* some examples; the specific algorithms or instructions configured to perform the functions of the logical components depicted in FIG. 3 are not executed locally to the server 50, but rather, may be provided to the fulfillment server 50 for execution through the use of one or more software development kits, which may include, e.g., one or more application programming interfaces (APIs), web APIs, tools to communicate with embedded systems, or any other appropriate implementation.

The logics of the fulfillment server 50 may be executed by one or more conventional processing elements 350, such as a central processing unit (CPU), digital signal processor, other specialized processor or combination of processors, or other circuitry that communicates to and drives the other elements within the fulfillment server 50 via a local interface 370, which may include at least one bus. As an example, the processing element 350 may execute instructions of software stored in memory 310, such as control logic 330, recommendation logic 320, and communication logic 332. While FIG. 3 illustrates one processor 350 which implements all of the various logics in the server 50, it is possible in other embodiments to employ multiple processors, which may be connected to the local interface 370, distributed over one or more computer systems that may be remotely located, or any combination thereof. In some embodiments, the processing element 350 may comprise an artificial neural network or other type of configuration for executing one or more machine learning algorithms based on instructions stored in memory 310.

Figure 4:
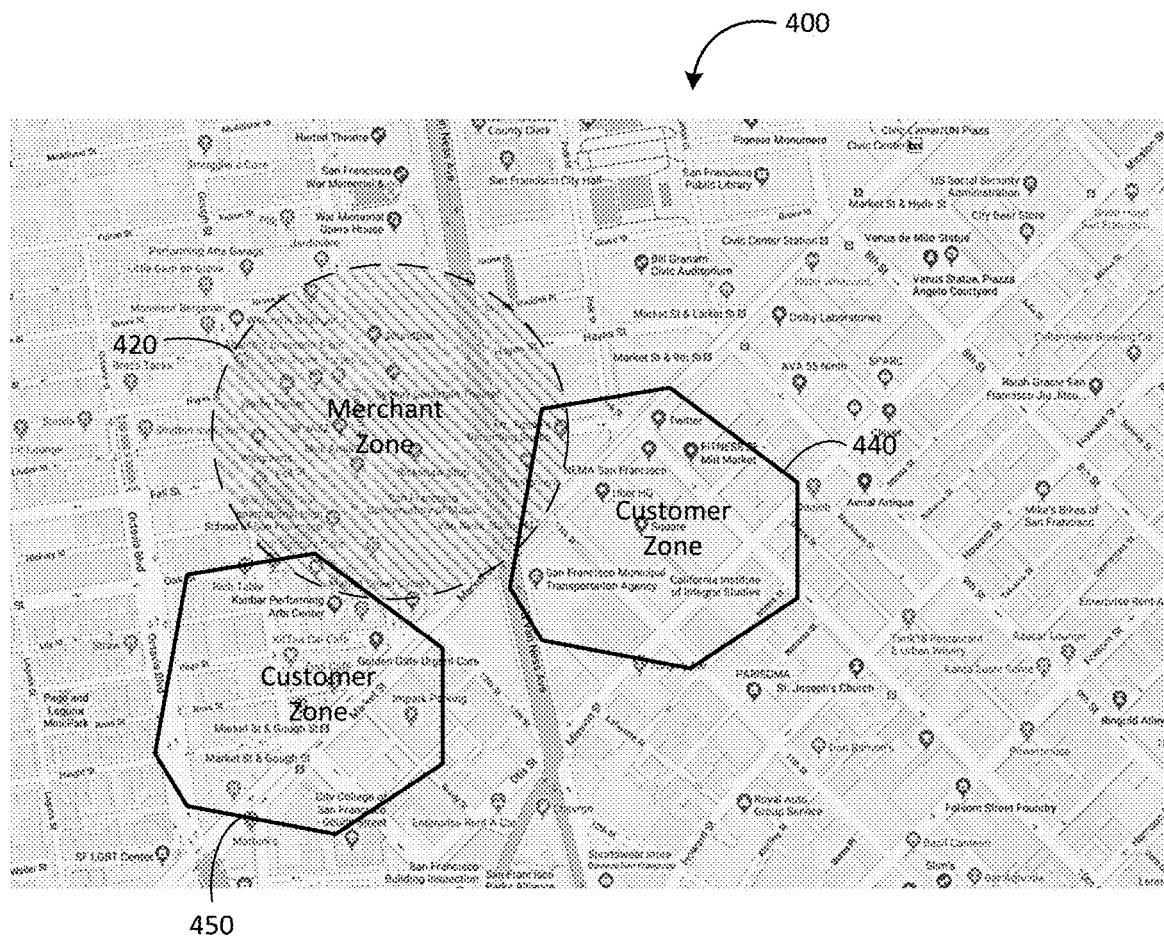
FIG. 4 illustrates a map from which proximity of a merchant device and one or more user devices can be determined in accordance with some embodiments of the present disclosure.

FIG. 4 illustrates a map from which proximity of a merchant device and one or more user devices can be determined, so as to generate dynamically changing fulfillment (e.g., delivery) zones, changing as the relative distance between the merchant and customer changes, in accordance with some embodiments. As discussed above, in one exemplary embodiment, a merchant is a mobile merchant, such as a food truck. The location of a merchant device 20, therefore, may be changeable as the food truck moves along a planned or ad hoc route, and may be relatively stationary during a period of time in which the food truck is parked for operation at a particular geographic location. A customer location may also be relatively stationary (e.g., when the customer is at home, at work, at an event, etc.), changeable (when the customer is traveling or being conveyed, e.g., by foot or car), or any combination of the two. In an exemplary embodiment, a customer may be notified as to a merchant's location based on a detection of proximity, such as whether the merchant device 20 is within a predetermined threshold distance from the customer device 40.

As illustrated, a virtual space or virtual boundary (a virtual representation of a physical or geographic space, such as a geo-fence) is created around each of one or more merchant devices 24 and around each of one or more customer devices 40. A virtual boundary may be understood as a logical boundary (or set of logical boundaries) that delineates a real geographic space. A virtual boundary around a merchant (merchant zone 420) is shown to be superimposed onto an area map 400, the merchant zone 420 indicating an area in which a particular merchant 20 is willing (and/or is determined to be able) to conduct business. Also shown on map 400 are respective virtual boundaries around each of one or more customers 40 (two customer zones 440 and 450) indicating respective areas in which a customer may be willing to act to make a purchase. These virtual boundaries may be defined by a radius of a certain predetermined distance (as shown, for purposes of example, in the illustrated circular merchant zone 420) or may be bounded by predetermined boundaries (as shown, for purposes of example, in the illustrated polygonal customer zones 440, 450). It will be understood of course the shapes and sizes of the exemplary zones are used merely for purposes of illustration and none of merchant zone 420 and customer zones 440, 450 (or any other similar boundaries) need be of any particular shape or size, or of the same size as the boundary around a similar entity. That is, with reference to FIG. 4, customer zone 440 around a first customer need not be the same size as customer zone 450 around a second customer. Rather the size and shape of any of merchant zone 420 or customer zones 440, 450 may be individually set by consideration of a variety of factors, such as but not limited to, characteristics relating to merchant or customer preference (FIG. 3, customer database 342 and merchant database 344), such as customer interest, demographics, history of purchases, and the like, characteristics of the geographic location (FIG. 3, location database 346), such as density of population, traffic patterns, ease of travel, or defined neighborhoods of zoning, weather, the time of day, other merchant information (FIG. 3, merchant database 344), such as the merchant's route of travel, the type of the product offered for sale, or the operational capacity of the merchant (such as staffing, inventory, etc.), and/or other appropriate factors. The virtual boundary 420 around the merchant device and/or the virtual boundaries 440, 450 around the customer devices may, in some embodiments, be set to a predetermined or default threshold of distance or a predetermined or default shape, or may be dynamically or deterministically selected based on, e.g., any or all of the factors mentioned above.

In one exemplary implementation, a notification of proximity is sent to a customer device 40 when the merchant zone 420 overlaps with customer zone 440 around that customer, which overlap may be triggered by the movement of either the merchant device 20 or a customer device 40, or by the movement of both. Put another way, one or more customers may be notified of the location of the merchant when the merchant's geo-fence enters their geo-fence. In the illustration of FIG. 4, customer zone 440 and customer zone 450 do not overlap each other, however, merchant zone 420 overlaps both customer zones 440, 450 to some degree. Therefore, both customers in zone 440 and in zone 450 may receive a notification of proximity to the merchant within merchant zone 420. In other embodiments, any number of customer zones may exist, corresponding to different customers, and any number of merchant zones may exist, corresponding to different merchants.

The notification of proximity sent to customers may be displayed to the proximate customer (here both of the customers within customer zone 330 and customer zone 450) via the respective customer-facing user interfaces 56 of each customer device 40. In some instances, the notification may be delivered only when a customer intentionally interacts with the user interface (e.g., by navigating a web browser to a particular page or by opening an app on their mobile device), however, in an exemplary embodiment, a notification is pushed to the customer device 40, e.g., by an app-based notification, an SMS, a phone call, a sound or visually-based alert or ping, or other type of information by the customer recommendation logic 324 (FIG. 3). In an exemplary embodiment, the notification is presented via the customer-facing user interface 56 in a manner that allows the customer to see the identity of the proximate merchant, and, in some embodiments, to see the products for sale by that merchant and/or to make a purchase of one or more products for later pick up or delivery. However, in other embodiments, a notification may provide to the customer a link or other information to guide the customer to another screen or webpage depicting the merchant information. In still other embodiments, the fulfillment server 50 may include in the notification of proximity real-time location information for the merchant, and/or an estimate of when the merchant's planned route may result in them exiting the customer zone 440. For instance, the notification may include hours (sent by the merchant if predetermined, or in some embodiments based on information regarding a route determination by the merchant recommendation logic 322 as described in greater detail above) within which the merchant may be available at the customer's location. Taken together, even if the location of a mobile merchant may change over time, or if the customer does not know the name and/or routes of a merchant, the customer may still be able to find, through notification, proximate mobile merchants.

In an embodiment, fulfillment server 50 may transmit a notification of proximity to the customer in a manner that includes, links to, or otherwise provides access to the customer to a point of sale (POS) interface presented on the customer device 40 via the customer-facing user interface 56 (FIG. 2A). Through the POS interface, the customer may be able to make purchase one or more products from the proximate merchant, without having to physically travel to the merchant and complete payment. The POS interface may also allow for the intake of payment information. For instance, via customer facing user interface 56, a customer may manually enter payment card information, or alternately, fulfillment server 50 or customer device 40 may access stored payment card information. This payment card information is stored by the fulfillment server, in transaction database 348, and is transmitted, along with information about the pending transaction with the merchant (such as listing of products purchased, cost, tax, discounts, etc.) from communication interface 52 of fulfillment server 50 to communication interface 62 of payment server 60. Payment server 60, which may be managed by a remote financial institution, card issuer, or other third party payment system, may then facilitate the authorization and processing of payment information. By these means, the customer is guaranteed to have purchased or reserved a product from the merchant in advance of fulfillment. Therefore, even in a scenario where the merchant is very popular and products sell out quickly, the customer need not physically visit the merchant to ensure their purchased product is available. In still other embodiments, the notification may provide an interface through which the customer can provide feedback about, express interest in, publicly share content about, or otherwise communicate with or about the merchant, the merchant's current location, and/or the merchant's products, separate from and additionally/alternately to making a purchase from the merchant.

In an alternate embodiment, the POS interface may additionally or alternately allow the customer to reserve or hold a product from the merchant for pick up, and to finalize payment upon pick up of the product. In such a scenario, the customer travels to the merchant's location (displayed to the customer via user interface 56 such as on a map) and finalizes payment by swiping, inserting, tapping, or otherwise interacting a payment card with the merchant's card reader 25, or directly entering payment information into the merchant device 20 (FIG. 1).

The consideration of whether to notify a customer of a merchant's proximity is based, in some embodiments, on an individual consideration of each merchant's geolocation and the customers within the virtual boundary surrounding the merchant location that may have sufficiently high interest in patronizing the merchant. In some embodiments, notification may therefore be sent based, not only on a proximity between the customer device 40 and the merchant device 20 (the overlap of virtual boundaries), but also (or alternatively), on a determined level of interest of the customer in the products offered by the merchant. This determination may be performed by the customer recommendation logic 324 (FIG. 3). In still other embodiments, notification may be based not on proximity between the customer and merchant devices (or not only thereon) but on one or more of other types of context data, such as past purchases made by a customer, a customer's indicated interest, a merchant's route, a merchant's intended marketing plan, or any other appropriate factor that may provide contextual information regarding the users within the geographic area in which the merchant intends to travel.

In one exemplary embodiment, a user's predicted interest is the most-heavily weighted of the factors in the determination of interest, however, in another embodiment, current conditions may be used to differently consider or weigh factors. For instance, if the merchant is a food truck vendor, and the merchant zone 420 and customer zone 440 intersect at a less popular or less common time for a meal (e.g., 4:00 pm), the customer recommendation logic 324 may anticipate that a relatively smaller percentage of users may be motivated to make a purchase from the merchant, even if notified of the merchant's proximity. Accordingly, at less popular times, the customer recommendation logic 324 may notify a larger subset of customers that are in proximity to the merchant, to capture as many potential customers as possible. Conversely, if the merchant and customer zones overlap at or near, e.g., a lunchtime hour, customer recommendation logic 324 may anticipate a higher percentage of notified users will act in response to the notification, and may therefore notify a smaller number of customers, so as to remain within the limits of the merchant's fulfillment capabilities. The foregoing is of course merely one example, and many other factors may be considered in the determination if various embodiments.

In certain geographic areas, for example cities, and at certain times of day/week the congregation of potential customers and potential merchants may be very high. For example, on a weekday at lunchtime in a large city, tens or dozens of food trucks may congregate in a single geographic location, such as at an intersection or within a few blocks. To avoid a scenario where a customer with a broad interest range receives an inconveniently high volume of notifications, some embodiments may aggregate notifications regarding multiple respective merchants into and within a single notification to a customer. For example, a notification sent by the fulfillment server 50 may list two or more merchants proximate to the customer. Alternatively, a notification may provide a link to a website, application interface, or screen that presents, in real-time (or near real-time), a list of merchants within a certain proximity of the customer, with merchants being added to or removed from the list as they enter and exit the customer geo-fence 440. In some embodiments, the customer (or, in some embodiments the merchant) may be able to, via the customer-facing user interface 56 (or the merchant-facing user interface 54), expand or contract their surrounding virtual boundary, so as to proximately overlap with a larger or smaller number of merchants (or customers). In some embodiments, this expansion/contraction may be performed by the user (via the customer-facing user interface 56 or the merchant-facing user interface 54) through a manual manipulation of a boundary on a map, a text-based, character-based, field-based, or selection-based input, through the selection of the desired area or the selection of one or more undesired areas, or any other appropriate means of data entry.

In another embodiment, where the merchant location is changeable, a scenario may exist where the merchant is travelling or is located at or near a border of the intersection between the merchant zone 420 and the customer zone 440, such that the merchant may repeatedly pass over the border between the zones. In this such a scenario, the fulfillment server 50 does not wish to repeatedly notify the customer each time the merchant enters (or exists) the customer zone, as such repeated notification would be duplicative and unhelpful to the customer, and may reduce customer goodwill. To address this, in some embodiments, the fulfillment server 50 may store, in its customer database 342 (FIG. 3), information sufficient to indicate a date-time value at which the customer was last notified of the merchant's proximity, that is, a "last-notified" time. If the last-notified time is within a predetermined time period of the current time (e.g., within 1 hour, 24 hours, 1 week, or any appropriate value), the fulfillment server will not sent an updated notification to the customer device 40. In alternate embodiments, the customer may, via an interactive screen provided by customer-facing user interface 56, set a notification preference, stored in customer database 342, such preference including a frequency of notification. This frequency may be tied to a particular merchant, a particular merchant type, to notification of proximity in general, or any other appropriate value. Additionally, in some embodiments, the customer may, via customer-facing user interface 56, permanently or temporarily turn off notifications by setting a preference via the customer-facing user interface 56. The fulfillment server 50 may store this preference in the customer database 342, and may consider this preference in its initial determination of high-interest users to notify. Such an embodiment allows for the customer to avoid notification when, e.g., the customer is on vacation or is otherwise experiencing a period where they would be unwilling or unable to visit merchants. By these means, the customer may control the number and frequency of notifications they receive.

In some embodiments, fulfillment server 50 may also allow the customer to independently search, using the customer-facing user interface 56, for one or more merchants. In such a case, the fulfillment server 50 may display on the customer device 40 information about one or more searched-for merchants. Such information may include a current location of a merchant, however, if the customer is not in the merchant's proximity, no separate proximity notification will be sent between the fulfillment server 50 and the customer device 40.

In some embodiments, the disclosed methods and systems send, to the merchant device 20, a notification of proximity of customers, such notification being customizable to a particular subset of the merchant's customer base. In one such embodiment, a merchant-facing user interface may allow the merchant to identify one or more "loyal" customers, for example those who make repeated purchases from the merchant, a fulfillment server may notify the merchant when it is in proximity to those loyal customers. In one embodiment, the merchant-facing user interface may allow the merchant to issue a coupon or promotion to an identified subset of the merchant's customer base.

Whether or not notification is presented to a customer device 40, a customer may be motivated to make a purchase from the merchant. Traditionally, when a mobile merchant is a food truck, a customer will pay for and obtain their purchased meal in a single transaction. In some scenarios of the present disclosure, the customer may wish to follow a similar process, where they purchase their meal via customer facing user interface 56, and then travel to a closely-situated food truck to pick up the already-purchased item. In other scenarios, the customer may wish to have food delivered to them. This difference in intention may depend in part on the actual distance between the customer and the merchant, that is, even when there is an overlap between the merchant zone 420 and the customer zone 440 (FIG. 4), the size of the zones and/or the overlap (or particular features about the geographic area, such as street layout, incline, or the like) may mean that the distance between the actual locations of the two entities is too significant for the customer to conveniently travel. Conversely, the merchant may be limited in its fulfillment capabilities. For instance, they may only be able to deliver within a constrained geographic area that is smaller than the zone 420 in which they wish to target interested customers, and may instead provide different fulfilment options for purchases made outside that constrained area, such as, e.g., delivery by a third party courier from the merchant location to the customer location, or delivery by the merchant to a third party location within the constrained area (such as, e.g., a central hub, kiosk, fulfillment center, or self-service delivery locker) where the customer can later pick up the product from the third party. In some embodiments, a mobile merchant may decide to drive to several delivery locations, and may seek to know whether such deliveries may be possible on a certain route, and/or what optimal route to follow to make such deliveries. In another embodiment, a mobile merchant may wish to be preemptively notified of changing fulfillment options based on a forward-looking knowledge of where the truck will be located at a particular future time (following a scheduled path of travel and/or delivery). To address these limitations, desires, and opportunities for fulfilment, the relative locations of the merchant and the customer may be taken into consideration when providing fulfillment options to the customer.

In some embodiments, after making a purchase, fulfillment logic 326 (FIG. 3) may be used to present on the customer-facing user interface 56, a set of one or more fulfillment options, i.e., ways in which the customer can obtain a purchased product after purchase. Different fulfillment options may be recommended for customers located within different proximity ranges from a merchant device 50. In still other scenarios, customer may be presented with these one or more fulfillment options after making a product selection but before making a product purchase, for example where payment is made at the time of pickup or delivery.

Figure 5:
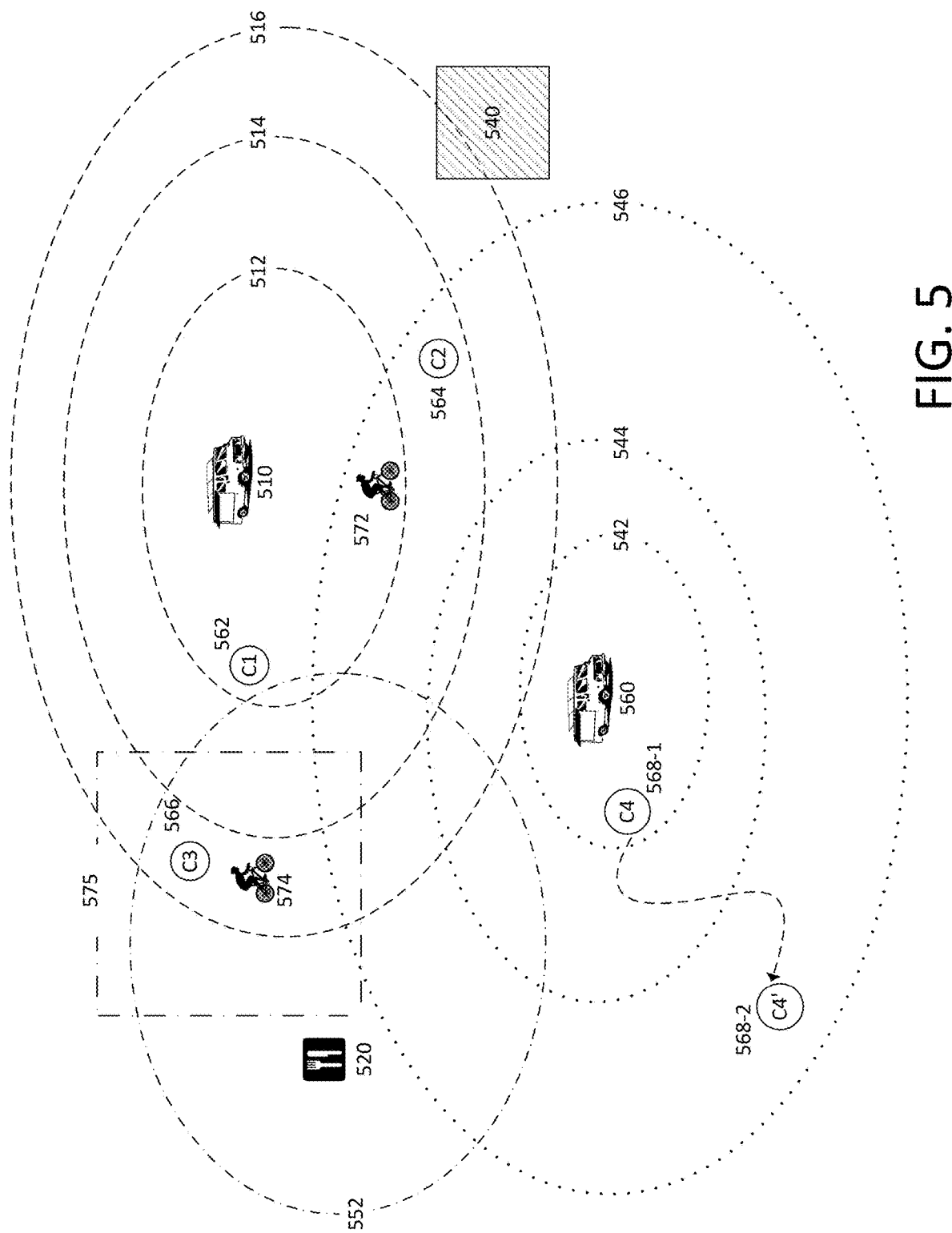
FIG. 5 illustrates exemplary fulfillment zones determined based on proximity between a customer location and a merchant or courier location in accordance with some embodiments of the present disclosure.

FIG. 5 depicts illustrates exemplary zones in which fulfillment options vary dynamically for the customers within, based on the customer's or merchant's variable proximity to each other, in accordance with some embodiments. The three (logical) proximity ranges 512, 514, 516 expand concentrically from a central, actual location 510 of a merchant device 20. The proximity ranges 512, 514, 516 may, in some embodiments, be generated by the fulfillment server 50 in a dynamic determination based on proximity between the customer device and the merchant device. In other embodiments (not specifically illustrated), proximity ranges need not be specifically based on customer location and/or merchant location, but may instead be based on dynamic (or predetermined) calculations of regions with different shares of customer-generated revenue, the processing capability of the merchant, the feasibility of transport for the merchant of a third-party courier, or any other appropriate basis for division.

In the embodiment of FIG. 5, the external boundary of the outermost range (here range 516) around merchant location 510 corresponds to the boundary of the merchant zone 420, the virtual boundary around the merchant location that defines the area in which interested customers may be notified of the merchant's proximity. Put another way, the fulfillment server 50 begins, in the exemplary embodiment, with a consideration of the area bounded by the merchant zone 420 and may then divide (and, in some embodiments subdivide) that area into proximity ranges 512, 514, and 516. It will be noted that while three concentric rings or ellipses 512, 514, and 516 are depicted in FIG. 5, each representing an increasingly distant range of physical location from actual merchant location 510, any number, shape, size, or breakdown of ranges may be possible in different embodiments. For instance, the ranges may have different radii, each radius being definable from a distance spanning miles (or across cities, states, or countries) to a distance spanning only a number of meters or feet, so as to provide for an intended level of granularity. For instance, the fulfillment server may generate only one range where every customer in proximity to the merchant may access identical options for fulfillment.

In other embodiments, the proximity ranges need not specifically correspond to the virtual boundaries described above with regard to notification. For example, while notification of proximity is supplied to customers within virtual boundaries overlapping the virtual boundaries of the merchant, customers outside of those boundaries may still individually seek out the merchant (e.g., by a search performed by the customer) and initiate a purchase that requires fulfillment. Accordingly, in some embodiments, one or more proximity ranges 512, 514, 516 may extend into or beyond the merchant zone 420, allowing fulfillment outside that zone.

As one example embodiment, fulfillment options may include pick up by the customer from the current location of the merchant, delivery by the merchant to the customer, or delivery to the customer via a third-party courier, though any option for fulfillment that can be practically implemented by the merchant may be possible in other embodiments. Rather than wholly different sets of fulfillment options in each range 512, 514, 516, in some embodiments, the sets of options may be determined to overlap in whole or part. The options offered in the different ranges may in such an implementation differ in that one or more ranges might define a preferred or suggested fulfillment option within that overlapping set. The location of a customer is calculated by the fulfillment server 50 based on the location information sent by module 42 of the customer device 40. In the illustrated embodiment of FIG. 5, customer C1 is indicated to be located at position 562 in a range 512 (a close-range distance of a first radius). If customer C1 makes a purchase, a set of fulfillment options for range 512, including, e.g., both pickup and delivery may be presented to the customer device, with pick up being a suggested or preferred option. Customer C2 is indicated to be located at position 564 in range 514 (a mid-range distance of a second, larger radius). Customer C2 might be presented with the same fulfillment options of pickup and delivery, however, a delivery option may be suggested or preferred. Customer C3 is indicated to be located at position 566 in range 516 (a long-range distance of a third, still larger radius). Customer C3 may only be presented with the option for delivery. Accordingly, each of customers C1, C2, and C3 receive a different set of data regarding their options for fulfillment by the merchant 510. These positions and methods of fulfillment of are of course merely exemplary in nature and other locations, number and/or shape of proximate ranges, types and break downs of fulfillment options, and types of configurations may be possible in other embodiments.

In the illustrative embodiment of FIG. 5, the merchant at position 510 may be a food truck that also has a brick-and-mortar branch at position 520. In an exemplary embodiment, food truck location 510 and brick and mortar location 520 are not considered as two disparate merchants, but rather, the proximity range 552 around brick and mortar location 520 (representing the area in which the brick and mortar location can offer one or more fulfillment options) may be considered as a fourth proximate range of the merchant at position 510. That is, in some embodiments, orders submitted to the merchant at the location 510 may be fulfillable by the merchant's brick and mortar location 520, and accordingly, the area of range 552 may be considered together with the ranges 512, 514, and 516 as making up the fulfillment area of the merchant. As one example with reference to FIG. 5, a customer C3 is located at position 566, which is within both range 516 (from the food truck) and range 552 (from the brick and mortar location). Accordingly, customer C3, upon placing an order, may be presented with, in addition to the fulfillment options offered by merchant location 510 (e.g., delivery only) may also be presented with one or more fulfillment options offered by merchant location 520 (e.g., pickup from location 520 and delivery from location 520). Other configurations, where the brick and mortar location may be considered as a separate merchant, may be possible in other embodiments.

FIG. 5 also illustrates a second merchant positioned at location 560, with three proximity ranges 542, 544, and 546. As illustrated, customer C4 has transmitted a location of 568-1, which is within range 542 of location 560. Customer C4 may begin an ordering process, and after placing an order and/or paying for the order (or in some embodiments, before confirming the order and/or paying for the order) may be presented with one or more fulfillment options specific to proximity range 542. For instance, customer C4 may be presented with options for pickup from location 560 and delivery from location 560, with pick up being suggested. With reference to FIG. 5, customer C4 is a mobile customer (for instance, a customer that is walking or traveling in or on a vehicle) that, prior to completing his order, changes location, transmitting a new location that is changed from position 568-1 to position 568-2, the customer C4 being referred to after the move as customer C4'. Accordingly, upon recognition of the new position 568-2, customer C4' may be presented with, in place of the previous fulfillment options, a second set of fulfillment options specific to proximity range 546. For instance, customer C4' may be presented with only an option for delivery, and may no longer be presented with an option for pickup. A similar result may be obtained where the customer is stationary, but where the mobile merchant device 560 changes location such that the customer's position relative to the merchant 560 moves from position 568-1 to 568-2 and from proximity range 542 to proximity range 546. In such a scenario, where a customer, previously located at location 568-1 (in a first proximity range relative to the merchant), is now located at location 568-1 in a different proximity range, the fulfillment options available to the customer may correspondingly change.

In some embodiments, either of the mobile merchant or the customer may move out of the fulfillment boundaries of the other after the purchase is completed but before a fulfillment option is selected. In such a case, the fulfillment options may be dynamically altered or limited. As one example, despite a large distance between a customer location and the actual merchant location 510, fulfillment may be limited to pick up once the customer is no longer within a merchant's delivery range (outside of range 530). As another example, fulfillment server 50 may facilitate the rescheduling of delivery or pickup to another, later opportunity where the mobile merchant is once again in proximity to the customer. Alternately, the fulfilment server 50, having previously stored payment data in a cache and having delayed transmission of that payment data to a payment server, may cancel the purchase after fulfillment becomes impossible (or impractical) and may delete stored payment data for the pending transaction.

Of note, customer C2, positioned at location 564, is located within both range 514 of merchant 510 and within range 546 of merchant 560. Accordingly, it may be understood that customer C2 may have received two proximity notifications, one relating to merchant 510 and one relating to merchant 560, at the respective times the merchants came within proximity of customer C2.

FIG. 5 additionally depicts two couriers 572 and 574. In some embodiments, a courier may be contacted for delivery in a case where their current location falls within a proximity range of a merchant that allows for fulfillment via delivery. In particular, in an exemplary embodiment, couriers 574 and 572 each may hold a respective courier device, such as a smartphone, tablet, iPad, or the like, which may communicate with the fulfillment service 50 via network 30. The courier device may include a location-determination device, such as a device capable of transmitting a beacon or signal, or in other embodiments, a GPS receiver or other device that may be used by the fulfillment server to determine a current location of the courier device, in a manner along the lines of that described above with regard to merchant device 20 and/or customer device 40. In some embodiments, fulfillment logic 326 (FIG. 3), in determining a set or one or more fulfillment options to present to the customer-facing user interface 56, may first determine whether the customer falls into a proximity range in which the merchant permits fulfillment through delivery. As one example, in the case that customer C3 at position 566 places an order with merchant 510, who offers fulfillment by delivery to customers within range 516, the fulfillment logic 326 may seek to determine all options for delivery fulfillment. Initially, the fulfillment logic 326 may determine that delivery by the merchant 510 is possible. Next, the fulfillment logic 326 may attempt to determine whether delivery by a third party courier is possible. The fulfillment server 50 may collect, from the courier device(s), a current location of the courier(s). As depicted, courier 572 is located within range 512 of merchant 510 and within range 546 of merchant 560. Courier 547 is located within range 516 of merchant 510 and is not within range of merchant 560. Additionally, in some embodiments, each of the couriers may have their own virtual boundary within which they may deliver. In FIG. 5, courier 574 with a virtual boundary 575 (illustrated as a square region 575 with alternately dotted/dashed borders) is the only courier who is within the delivery range 516 and whose virtual boundary 575 includes the location of the customer C3. In such a scenario, the fulfillment logic 326 may include, among its fulfillment options, fulfillment by courier 574, but would not include fulfillment by courier 572. In one exemplary embodiment, the courier 574's location will only be broadcast or shared with the fulfillment server 50 in a case that the courier 574 is willing to deliver within his virtual boundary (which is set by the courier through a courier-facing user interface or by a default or predetermined range from the courier, among any other appropriate measurement, in some embodiments with consideration of weather, traffic, geographic or street layout, street closures, other current and geographic conditions, and the like). In alternate embodiments, the fulfillment server may contact the courier 574, via a courier-facing user interface (not specifically shown), prior to offering fulfillment by courier, to confirm his availability to fulfill orders.

In another embodiment, in addition to or as an alternative to the proximity ranges described above, one or more individual proximity areas 540 may be identified within the merchant zone. One such individual area 540 is illustrated as a rectangular region 540 (with hatched background) overlapping proximity range 516, though region 540 may be any size, shape, or location in different embodiments. An individual proximity area 540 may correspond, for example, to a defined building, campus, location, or logical grouping of individuals, businesses, or other entities for which a unique set of fulfillment options may be possible or required. As one example, a corporation or organization may have an agreement with a merchant for a particular type or method of fulfillment (as one example, catered food delivery to a predetermined location), or may be limited to a particular type of fulfillment by corporate, organizational, local, governmental, or community guidelines or bylaws. In such a case, that corporation or organization, bounded geographically by the individual area 540, may require a unique set of one or more fulfillment options. As another example, an individual area 540 may correspond to an entity for whom or an area in which the merchant or the party managing fulfillment server 50 may not wish to provide service (as one example, a restricted facility into which the merchant's products cannot be taken, or a geographical border beyond which importation is restricted), in which case no corresponding fulfillment options may be provided.

Figure 6A:
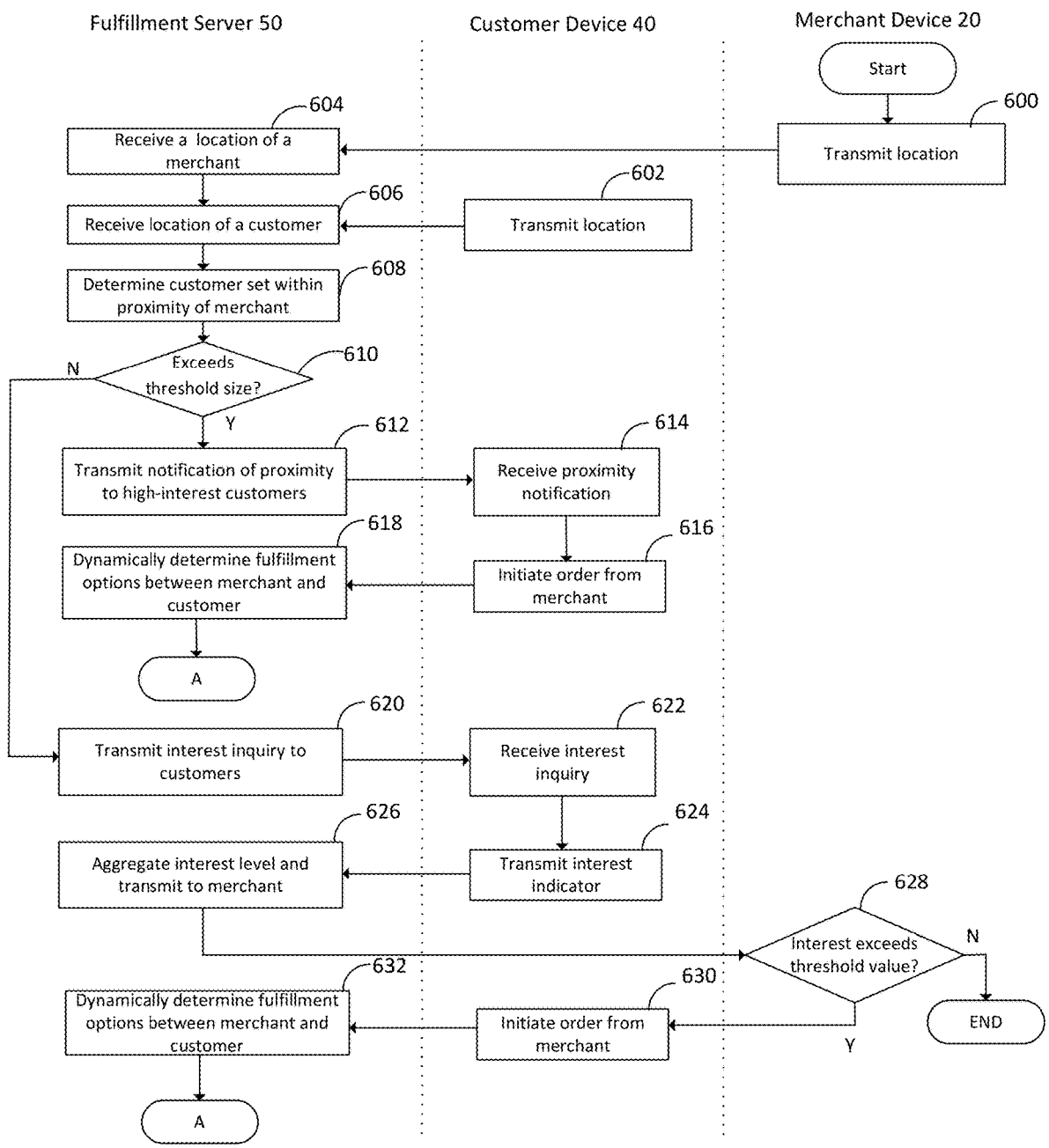
FIG. 6A is a flow chart of a process of determining customer proximity and interest and initiating an order between a customer and a merchant in accordance with some embodiments of the present disclosure.
Figure 6B:
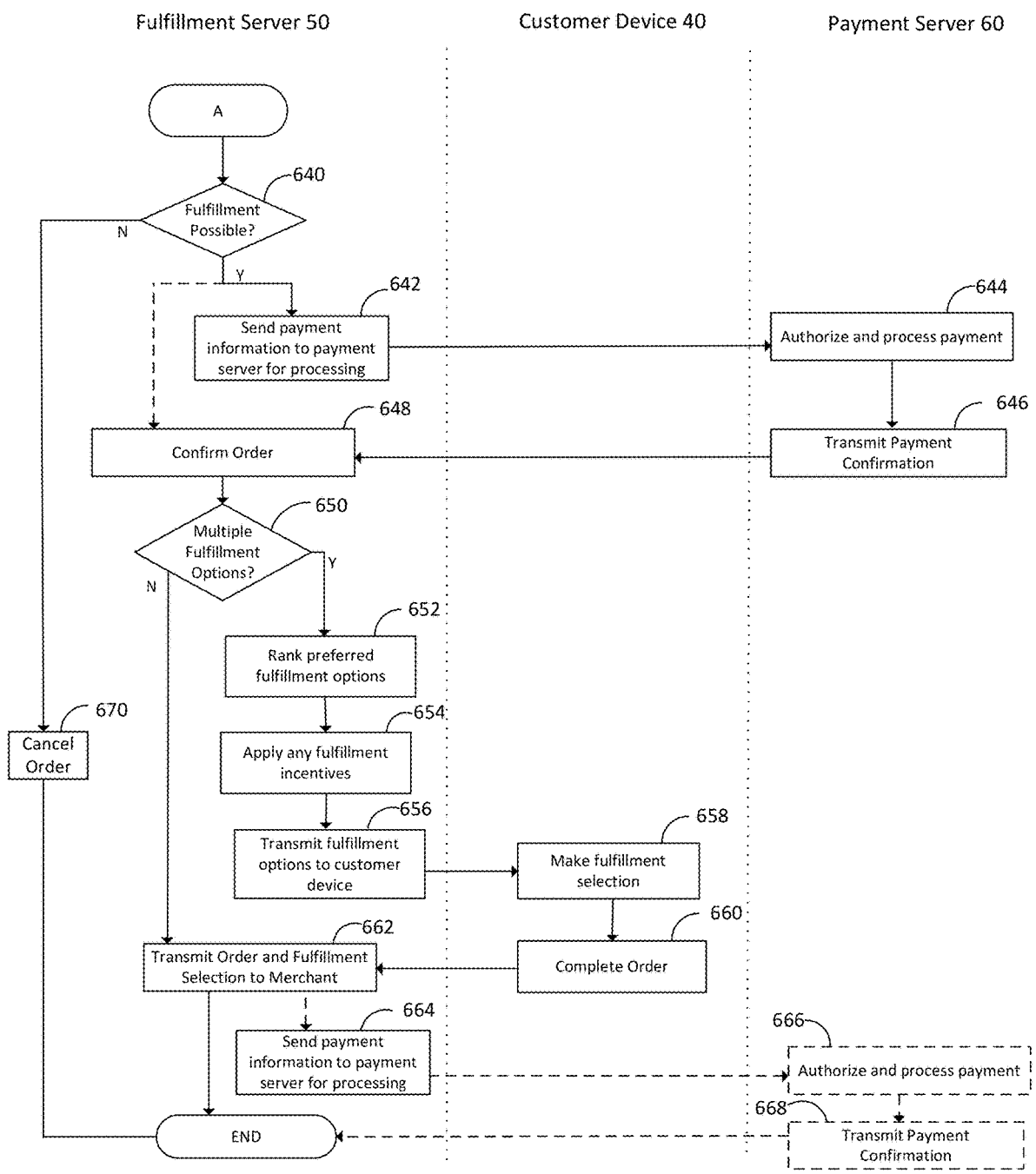
FIG. 6B is a flow chart of a process of determining a fulfillment method for an order between a customer and a merchant in accordance with some embodiments of the present disclosure.

FIGS. 6A and 6B depict flow charts illustrating exemplary processes according to some implementations of the present disclosure. Flow charts 6A and 6B reference, for purposes of example, components discussed above with respect to FIGS. 1-5. Regarding the processes 600-670, while the various steps, blocks, or sub-processes are presented in a given order, alternative embodiments can perform routines having steps, or employ systems having steps, blocks or sub-processes, in a different order, and some steps, sub-processes, or blocks can be deleted, moved, added, subdivided, combined, and/or otherwise modified to provide alternative or sub-combinations. Each of these steps, blocks, or sub-processes can be implemented in a variety of different ways. Also, while steps, sub-processes, or blocks are at times shown as being performed in series, some steps, sub-processes or blocks can instead be performed in parallel or in a distributed manner, or can be performed at different times as will be recognized by a person of ordinary skill in the art. Further, any specific numbers noted herein are only examples; alternative implementations can employ differing values, ranges, or components.

The process of FIG. 6A begins at step 600, where a merchant device 20 transmits, to the fulfillment server, a data packet, such as location information, at which the merchant is currently located, for example through use of a GPS transmitter. Similarly, one or more customer devices 40 also transmit their respective locations, e.g., via a GPS transmitter, at step 602. In an example, the merchant and customer devices send their respective locations periodically. In other examples, the merchant device 20 and/or customer devices 40 may provide their responsive locations in response to requests from another entity, such as the fulfillment server 50. In other embodiments, the data packet may include information such as past purchases, customer profile, merchant profile, and so on.

At steps 604 and 606, the fulfillment server 50 receives the transmitted location of the merchant device 20 and the transmitted locations of at least one customer device 40, respectively. For instance, the fulfillment server may receive a GPS location of the merchant device 20 and the customer device 40 if the merchant device and the customer device have enabled location tracking. In another embodiment, the fulfillment server 50 can interact with a payment server 60 to receive a real-time location of the payment transactions as a proxy to the location of the merchant and/or the location of the one or more customers.

At step 608, the fulfillment server 50 analyzes the received location data to determine a set of customers within proximity of the merchant device 20. For example, the fulfillment server 50 determines whether there is any overlap between a defined geo-fence surrounding the merchant location, and any of the respective defined geo-fences surrounding the locations of all customer devices 40 known to the fulfillment server. In some embodiments, in the interests of conserving computing resources, the fulfillment server may only consider the locations of customers known to be local to the geographic area of the current location of the merchant, but in other embodiments, where the fulfillment server is not resource-constrained, any customer is considered (as some customers may be travelling or otherwise not limited to a particular geographic area). In case of the merchants or customers being mobile, the customer set changes in real-time, or at predetermined intervals (e.g., every 10 seconds, or any other appropriate value). The fulfillment server then takes snapshots of the merchant-customer sets based on relevance of the relationship between customer and merchant, for example based on customer interest. In a case where the snapshots change rapidly, it may indicate that one or both of the customer device and the merchant device are moving rapidly, and therefore may be in a condition too transient to process and fulfill an order from the merchant to the customer. However, in a case that the snapshots are wholly or mostly unchanged over a predefined period of time, indicating that the relative distance between the customer and the merchant is stable, then that customer set may be chosen for the remaining steps.

The set of customers determined to be in proximity to the merchant may be quite large, particularly in urban areas, therefore, at step 610, the fulfillment server 50 determines whether the set of proximate customer has exceeded a predetermined threshold value. If the amount of proximate customers has exceeded a threshold value ("Y" at step 610), the processing continues to step 612, in which the fulfillment server filters that customer set to only those customers who are determined to have interest that exceeds a threshold value, and transmits a notification of proximity only to high interest customers. That is, based on information stored about the preferences and historic purchases and interests of the customers, in comparison to the merchant descriptions, products, prices, and other categorizations, and/or based on information about the current market, weather, traffic, and other external conditions, the fulfilment server may generate a subset of proximate customers who may have an interest (or sufficient interest) in the merchant or otherwise have a sufficient likelihood of purchasing from the merchant. The sufficiency of the level of interest to amount to a high-interest customer or a sufficient likelihood or purchasing may vary based on the pool of customers available, and/or factors relating to current conditions. In some embodiments that merchant may, through interaction with the user interface 54, alter or adjust the filtered set of customers to notify a higher or lower number of customers of the merchant's proximity, a consideration described further below with respect to step 628.

In step 612, a notification is sent from the fulfillment server 50 to each of the filtered set of customer devices 40 to indicate that the merchant device 20 is proximate to the respective customer. For example, the fulfilment server 50 can send, as a notification, a text message, an electronic message, an interstitial in a third party application, and may optionally or alternatively include a link to enable payment, fulfillment or any other kind of engagement from the merchant, e.g., via third-party application downloadable or accessible via the customer device.

At step 614, the notification indicating proximate (and optionally, relevant or of-interest) merchants is, received by the customer, e.g., on a customer device.

At step 616, the customer via customer device 40 can initiate a purchase from the merchant. Optionally, step 616 may occur after fulfillment options are determined, e.g., after step 618 (or within the processes described with reference to FIG. 6B). In some embodiments, the customer device may present a user interface through which a customer can, if desired, initiate a purchase from the merchant at step 616.

In some implementations, the fulfillment server may automatically place an order (e.g., as a subscription service to the customers) with the merchant without an explicit intervention from the customer. To this end, steps 616-618 may be performed by the fulfillment server 50.

Upon the initiation of the purchase, the fulfillment server 50, at step 618, may store any payment information regarding the pending transaction (such as a customer's payment card information, invoice information, tax information, and the like) and begin a determination of which proximate range the customer falls into. As a result, the fulfillment server 50 dynamically determines a preliminary set of corresponding fulfillment options available to the customer. Because step 618 involves a dynamic determination, the result of this determination is not a static result; rather, the result of the determination may change when conducted at different points in time and/or in different conditions. In some embodiments, this determination of proximate range and fulfillment options may involve a re-computation of the proximity between the customer and the merchant, and/or the transmission of updated location data by the customer and the merchant. In other embodiments, rather than a mere determination of relative locations of the customer and the merchant, alternate or additional methods may be used to generate a preliminary set of fulfillment options. For instance, customer preferences may specify one or more preferred or restricted fulfillment options; for instance, where a customer sets a preference that they are unable or unwilling to pick up from a merchant, pickup options will not be included among the totality of fulfillment options presented to the customer. In another instance, the size and/or requested timeframe of the order may limit the fulfillment options available; for instance, a mobile merchant may be unable to deliver a large order within a set period of time but may be able to deliver a single meal or dish. In yet another example, the merchant associated with merchant device 20 may have one or more alternate, non-proximate locations, which locations may still offer options for fulfillment not available by the mobile merchant location. Additionally, the fulfillment server may contact one or more third-party couriers, storage or temporary holding facilities, or other third-party entities to provide alternate possible fulfillment methods not strictly tied to the relative location of the merchant device 20. Still further, the determination of fulfillment options may consider non-standard, promoted, or incentivized fulfillment options from a merchant, for example collaborations between one or more merchants or temporary or pop-up fulfillment options by the merchant associated with merchant device 20. In one embodiment (not shown), the fulfillment server, rather than storing payment information, may immediately send the payment information to a payment server from payment processing while additionally (in parallel or serially) determining the customer's proximity range. Once the fulfillment options have been determined, the process may proceed to point A, after which fulfillment determination (described further in FIG. 6B) begins.

If the total number of proximate customers has not exceeded a threshold value ("N" at step 610), the process continues to step 620, in which an interest inquiry is transmitted to all proximate customers to determine if interest is sufficient to meet the merchant's standards (i.e., enough interest to justify the merchant staying at the current location). At step 622, the interest inquiry for the relevant proximate merchant is received on a customer device 40.

At step 624, one or more customers who received the interest query may, via a user interface 56 on their customer device 40, indicate an interest in the merchant 20. This interest indicator may take the form of an interactive button, a text message, an advertisement, an interactive text field, and a similar engagement component, to receive an interest from the customer an indication to make a purchase of a certain product, a like or share via social media, or any other interaction with the customer device 40 that may indicate that the customer is more likely to make a purchase from the proximate merchant.

At step 626, the fulfillment server receives any interest indicators transmitted by the one or more customer devices 40, and aggregates the interest indicators to determine an overall interest level. This determined interest level (or in some embodiments, the interest indicators themselves or a subset thereof) is transmitted to the merchant device 20.

At step 628, the merchant device 20 receives the information suggesting the customer's interest level, and determines whether the level of interest is sufficiently high to justify remaining at the current location. In an exemplary embodiment, the interest level is compared to a predetermined threshold value. The threshold value may be, for example, a number of unique customers that has expressed an interest in the merchant, a dollar value of purchases or available items referenced in the transmitted interest indicators, or any other appropriate value. In other embodiments, in step 628, rather than comparison of customer interest to a predetermined or numeric threshold value, the merchant may receive one or more of the interest indicators transmitted by the customers in step 624, and may make a subjective determination as to whether the merchant's current needs are satisfied by the customers' indicated interest. For example, in some embodiments, the merchant may consider one or more of whether the customers have expressed (in step 624) interest in a particular product the merchant is interest in selling, the merchant's current inventory, the merchant's current sales, the current time of day, the merchant's perception of customer interest in other locations, the merchant's own marketing goals, and/or any other qualitative indicators of customer interest. In some embodiments, the merchant may consider qualitative indicators of customer interest along with one or more quantitative indicators (such as comparison of the interest to a threshold value).

If the customer interest has not exceeded a threshold value ("N" at step 628), the merchant may determine that the customer's current interest in placing an order with the merchant is not sufficiently high to remain in the merchant's current location, and the process ends.

If the customer interest has exceeded a threshold value ("Y" at step 628), the process continues to step 630, at which a customer via customer device 40 can initiate a purchase from the merchant. Optionally, step 630 may occur after fulfillment options are determined, e.g., after step 632 (or within the process described with respect to FIG. 6B). The customer device may present a user interface through which a customer can, if desired, initiate a purchase from the merchant at step 630. Upon the initiation of the purchase, the fulfillment server, at step 632, may store any payment information regarding the pending transaction and may begin determination of which proximate range the customer falls into. As a result, the fulfillment server 50 dynamically determines a preliminary set of fulfillment options available to the customer, in a manner along the lines of those described above with regard to step 618. Because step 632 involves a dynamic determination, the result of this determination is not a static result; rather, the result of the determination may change when conducted at different points in time and/or in different conditions. Once the fulfillment options have been determined, the process may proceed to point A, after which fulfillment determination (described further in FIG. 6B) begins.

With reference to FIG. 6B, an exemplary process begins, after point A, with step 640, in which the fulfillment server 50 looks to the preliminary set of determined fulfillment options (determined in steps 618 or 632 of FIG. 6A), to see if fulfillment to the customer is possible, that is, if at least one option for fulfillment exists. If no fulfillment options are available ("N" at step 640), for example, if the customer is far out of range of the merchant, such as in another city or state, if the order is too large or urgent for the merchant to fulfill, or fulfillment is otherwise impractical or impossible, the process proceeds to step 670, at which the customer's initiated order is cancelled and the process ends. If at least one fulfillment option is available ("Y" at step 640), the process continues, and may proceed in one of two ways.

In one option, indicated by a solid line, the process continues to step 642, in which the fulfillment server 50 sends the customer's stored payment information to payment server 60. The payment server 60 receives the payment information and confirms authorization for and processes payment in step 644. The payment server then transmits a confirmation of payment to the fulfillment server 50 in step 646.

Fulfillment server 50, having received confirmation of payment, confirms the order, in step 648, to one or both of the merchant (via merchant-facing user interface 54) and the customer who placed the order (via customer-facing user interface 56). The process then continues to step 650. In an alternate embodiment, confirmation of the order to the merchant and the customer who placed the order may instead occur after the determination and selection of fulfillment options (which are described in step 650-658 below). In such an embodiment, confirmation of the order to the merchant and/or the customer may occur, for example, after completion of the order by the customer (step 660 described below) or at the time of transmission of the order and fulfillment selection to the merchant (step 662 described below)

In a second option, indicated by a dotted line, the customer's payment is processed later (for example, after fulfillment is completed), and the process instead continues directly to step 650.

In step 650, the fulfillment server determines whether multiple fulfillment options exist, that is whether the determination of preliminary fulfillment options (determined in steps 618 or 632 of FIG. 6A) includes more than one option for fulfillment, viz. at least two options. If it does not (only one fulfillment option is available; "N" at step 650), the process proceeds to step 662, in which the order is transmitted to the merchant device along with an indication of the one method of fulfillment for the order. In some embodiments, in its determination of fulfillment options in step 650 (or in steps 618 and/or 632 described above), the fulfillment server may contact, engage, or otherwise interact with one or more third party entities such as couriers to determine their availability and/or interest to provide or assist with a method of fulfillment.

If payment has already been processed (steps 642-646), as indicated by the solid line, then the process ends with a completed processing of the customer's order, which is later fulfilled through the one fulfillment method. If payment has not already been processed, then either prior to or after completion of fulfillment, the process continues to step 664, in which the fulfillment server 50 sends the customer's stored payment information to payment server 60. The payment server 60 receives, confirms authorization for, and processes the payment in step 666. The payment server then transmits a confirmation of payment to the fulfillment server 50 in step 668. For instance, steps 664-668 may be performed in a case where the customer does not wish to pay, or the merchant does not wish to receive payment, until the customer has received their order.

If more than one fulfillment option is available to the customer ("Y" at step 650), the process proceeds to step 652, in which the fulfillment server may rank the fulfillment options for presentation to the customer device 40 via the customer interface 56. This ranking may be done based on a variety of factors, including context data transmitted by the merchant device 20, the customer device 40, and/or collected from one or more external databases 382. For example, one or more of the following may be considered: a merchant preference or a customer preference (stored in advance or entered at the time the order was initiated), the availability of third-party couriers or services, the current weather or traffic conditions, the particular geographic location of the merchant, the number of orders received by the merchant, the time of day, and any other appropriate factor which may impact the ability or ease of the merchant to fulfill the customer's order or of the merchant, customer, or courier to travel within the relevant geographic areas. In some embodiments, the ranking of the fulfillment options may involve a filtering or culling of fulfillment options, for ease of display on the customer device 40 or to limit the choices presented to the customer. For instance, in a situation where four or more fulfillment options may be available (such as pickup from a merchant's mobile location, pickup from a merchant's one or more brick and mortar locations, pickup from a third-party location, delivery through the merchant, delivery through a courier, etc.), the fulfillment server 50 may, based on one or more of the factors listed above, select, e.g., three fulfillment options for presentation to the customer via the customer-facing user interface 56 (though any number of options may be selected in different embodiments).

In step 654, fulfillment server 50 may consider the applicability of any fulfillment incentives. In some embodiments, fulfillment options may be specified in advance by the merchant via the merchant-facing user interface 54. In other embodiments, the fulfillment server 50 may determine one or more incentivized options based on current conditions relevant to fulfillment, such as the number and complexity of orders received by the merchant, the availability of couriers or other third party delivery agents, the walkability and safety of the geographic area in which the customer is located, the current weather and/or traffic conditions of the current location of the merchant, or any other appropriate factor which may favor one or more fulfillment options over another. Such information may be collected by the fulfillment server from context data transmitted by the merchant device 20, the customer device 40, stored in memory 310, and/or pulled from one or more external databases 382. In some embodiments, the fulfillment server may favor options that facilitate ease of fulfillment, merchant satisfaction, and customer satisfaction, though different priorities may be applied in different embodiments.

The process then continues to step 656 in which a final list of fulfillment options (considering preferred and/or incentivized options) is transmitted to the customer device 40. In some embodiments, the fulfillment options are displayed in a selectable manner, on the display of the customer device 40 via customer-facing user interface 56.

In step 658, the customer makes a fulfillment selection via the customer-facing user interface 56. This selection completes the order, in step 660, and the process continues to step 662, described above.

In some implementations, the fulfillment server may automatically place an order (e.g., as a subscription service to the customers) with the merchant without an explicit intervention from the customer. To this end, steps 658-660 may be performed by the fulfillment server 50.

Some embodiments provide for the transmission of information to the merchant to facilitate optimization of the merchant's routes, products, inventory, and/or other controllable characteristics of the merchant's business to maximize customer response, return on investment, or other potential merchant goals. In one such embodiment, information regarding one or more customers can be compiled or aggregated by the fulfillment server 50 and the compiled or aggregated data presented to the merchant.

Figures 7A, 7B:
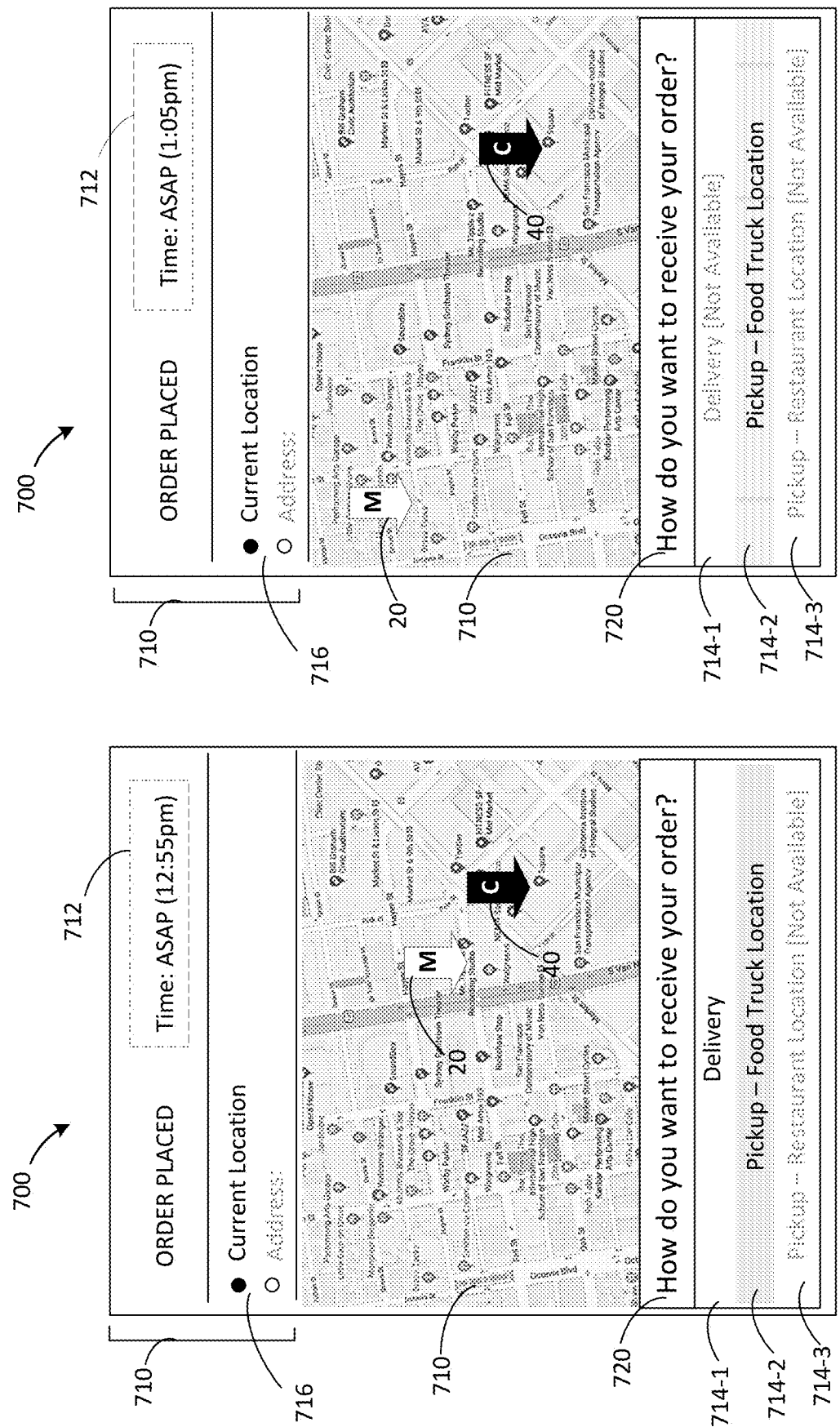
FIGS. 7A, 7B, 7C, 7D, and 7E illustrate customer-facing graphical user interfaces for selecting a fulfillment option for an order between a customer and a merchant in accordance with some embodiments of the present disclosure.

FIGS. 7A-7E depict example customer-facing graphical user interfaces (GUIs) for selecting a fulfillment option for an order between a customer and a merchant in accordance with some embodiments of the present disclosure. Turning first to FIG. 7A, GUI 700 presents information that might appear on a display screen of a customer device 40 when using a customer-facing user interface 56. GUI 700 includes a map region 705, which displays the current location (based on, e.g., GPS data) of the customer device 40 and the merchant device 20. The locations of the customer device and the merchant device may change in real-time based on updated location information transmitted from the devices to the fulfillment server 50. While the GUI 700 uses arrows to display the locations, other embodiments may use any graphical or non-graphical (e.g., text-based) representation. In some embodiments, only the location of the merchant device 20 is displayed (or conveyed via text or characters), under the assumption that the owner of the customer device 40 is aware of their current location.

In the exemplary illustration of FIG. 7A, the customer has already placed an order with a merchant (as can be seen in header region 710). Header region 710 also includes a fulfillment time indicator 712. In the illustration, the fulfillment time indicator 712 indicates that the customer has chosen fulfillment as soon as possible ("ASAP") and that the anticipated time of fulfillment is 12:55 pm. The header region 710 includes a field 716 in which the customer can specify whether to use their current location (based on, e.g., GPS data collected from transmitter 42 of customer device 40) or whether the customer prefers to specify an address (i.e., a static address that does not change as the customer device moves). Specification of an address may be preferred in scenarios where GPS data is unreliable, or the customer is moving.

The bottom region 720 of the GUI 700 lays out for the customer one or more fulfillment options. As illustrated, a delivery option 714-1 is available, as well as an option 714-2 for the customer to pick up their order from the food truck location 20. The third option (pickup from a restaurant) is shown as grayed-out, with an indicator of "[NOT AVAILABLE]". In other embodiments, options that are not available may be omitted entirely from the GUI 700, or may be otherwise indicated as not available (such as by one of graying out, crossing out, written indicator, or the like). As can be seen, the illustration of FIG. 7A, the customer has selected option 714-2, to pick up their order from the food truck location. Alternatively, the option is automatically selected based on the optimized delivery options. In some embodiments, the fulfillment time indicator's expected fulfillment time may be changed in accordance with the fulfillment method selected within region 720. FIG. 7A (and the remainder of FIGS. 7B-7D) are exemplary in nature, and in other implementations different elements may be shown on the GUI 700 in different configurations.

FIG. 7B illustrates GUI 700 in a scenario where, in comparison to the GUI of FIG. 7A, the customer device 40 has remained in the same location, while the merchant device 20 has moved, changing locations to be farther from the customer device 40. In accordance with this change in distance, it can be seen in the bottom region 720 of GUI 700 that the fulfillment options available to the customer have correspondingly and dynamically changed such that the delivery option 714-1 is no longer available to the customer. In addition, while the same option 714-2 (pickup) is selected as in FIG. 7A, because of the increased distance between the merchant and the customer, the fulfillment time indicator 712's indication of the expected fulfillment time has increased in length, changing from 12:55 pm to 1:05 pm.

Figure 7C:
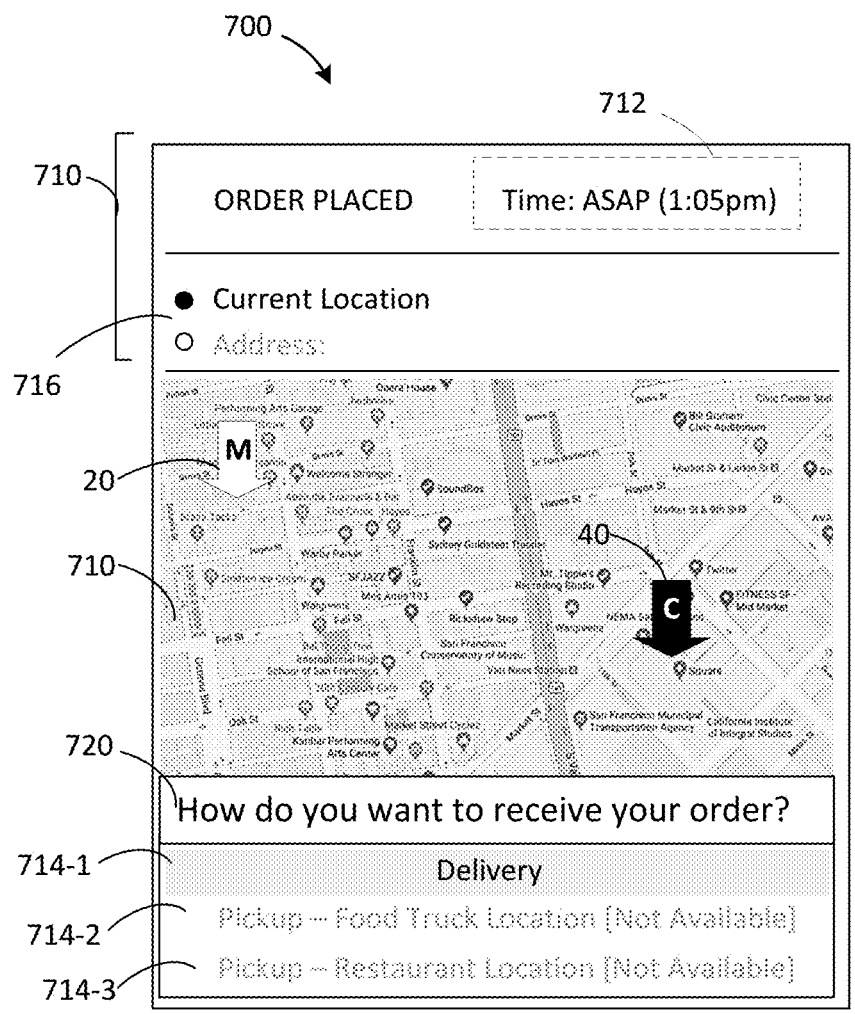

FIG. 7C illustrates an alternate embodiment of GUI 700, differing from the embodiment of FIG. 7B in the selection of fulfillment options presented to the user. In particular, in FIG. 7C, it can be seen that merchant device 20 has moved, changing locations to be farther from the customer device 40 as compared to the merchant/customer locations illustrated in FIG. 7A. In accordance with the increase in distance, as can be seen in the bottom region 720, the delivery option 714-1 is still available to the customer, while the pickup option 714-2 is no longer available.

Figure 7D:
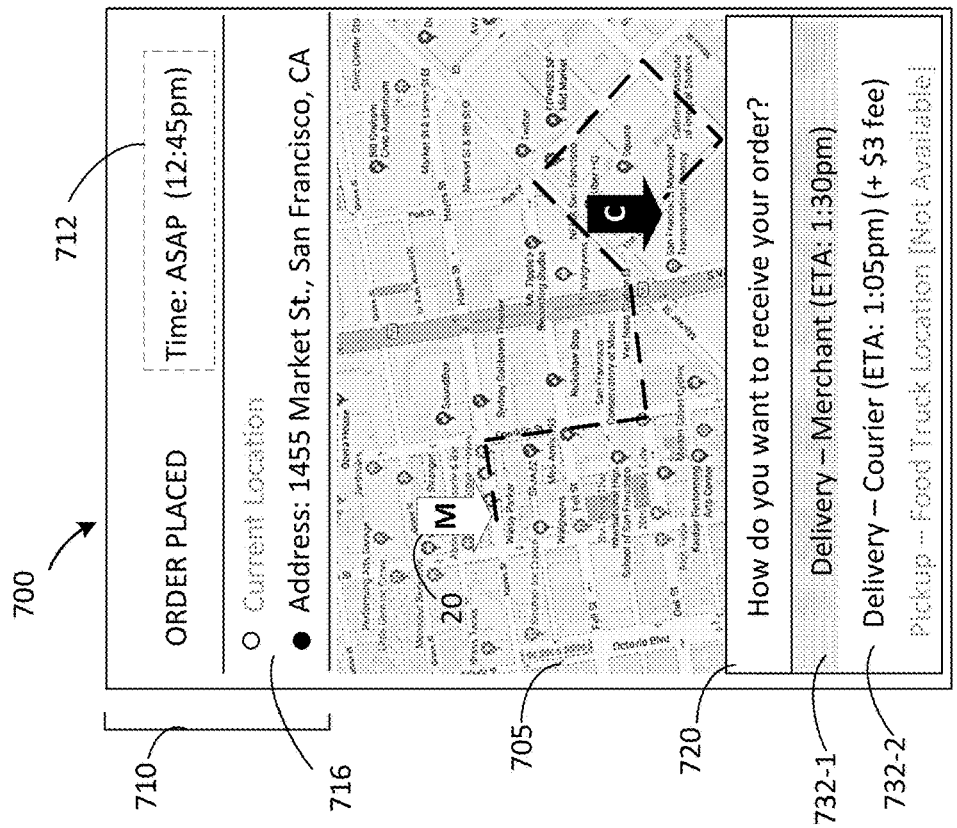

FIG. 7D illustrates GUI 700 in a scenario where "Address" has been selected in field 716, as an alternative to the scenario shown in FIG. 7A in which a "current location" is used. This selection may initiate the display of a QWERTY keyboard (or other input mechanism) in field 730 that the customer can use to enter character-based address information. Once an address has been entered, the map region 705 may, in some embodiments, display only the location of the merchant device 20, as the customer location is stationary. However, in other embodiments (not shown) both the customer and merchant locations may be shown. The user, after entering an address in field 730, may then be presented with a GUI (as in, e.g., FIG. 7E) showing different fulfillment options based on the user's entered address. In some embodiments, if address data is specified in field 730 and selected in field 716, then the fulfillment server 50 will base all determinations of proximity using the specified address data, until cancellation or fulfillment of the customer's order or otherwise specified by the customer.

Figure 7E:
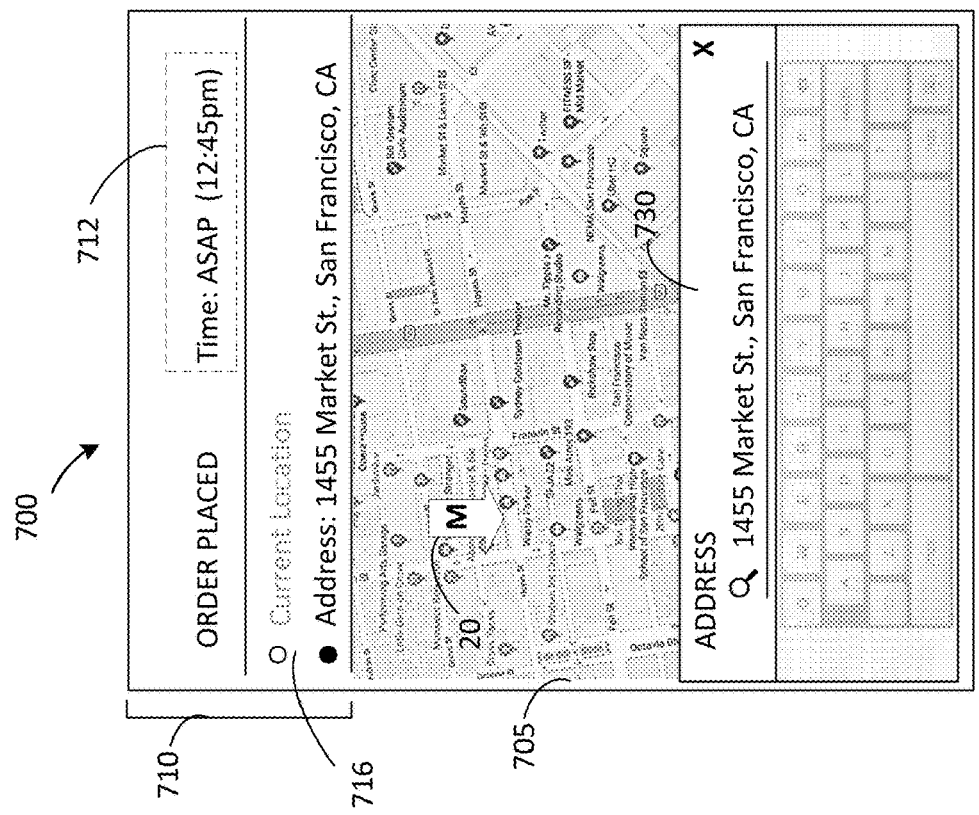

FIG. 7E illustrates a GUI 700 on which multiple delivery options are shown as available to the user for fulfillment. In the bottom region 720, the GUI 700 displays to the customer a first option 732-1 for delivery from the merchant, along with an estimated fulfillment time, and a second option 732-2 for delivery from a courier, along with an estimated fulfillment time. In the example of FIG. 7E, the delivery option 732-2 is also indicated to have an additional cost which is passed to the customer, however, other embodiments may or may not have this feature, or may use different pricing structures that are invisible to the customer. The map section 705 of FIG. 7E illustrates that, when option 732-1 is selected, a delivery path of the merchant is depicted. In some embodiments, this delivery path may change in real-time based on updated location information received from the merchant device 20. In other words, as the merchant moves, where the movement is determined by an associated device such as merchant device 20, the delivery options 732-1 and 732-2 dynamically change, e.g., prioritized, surfaced on the display, removed from selection, and so on.

Figure 8B:
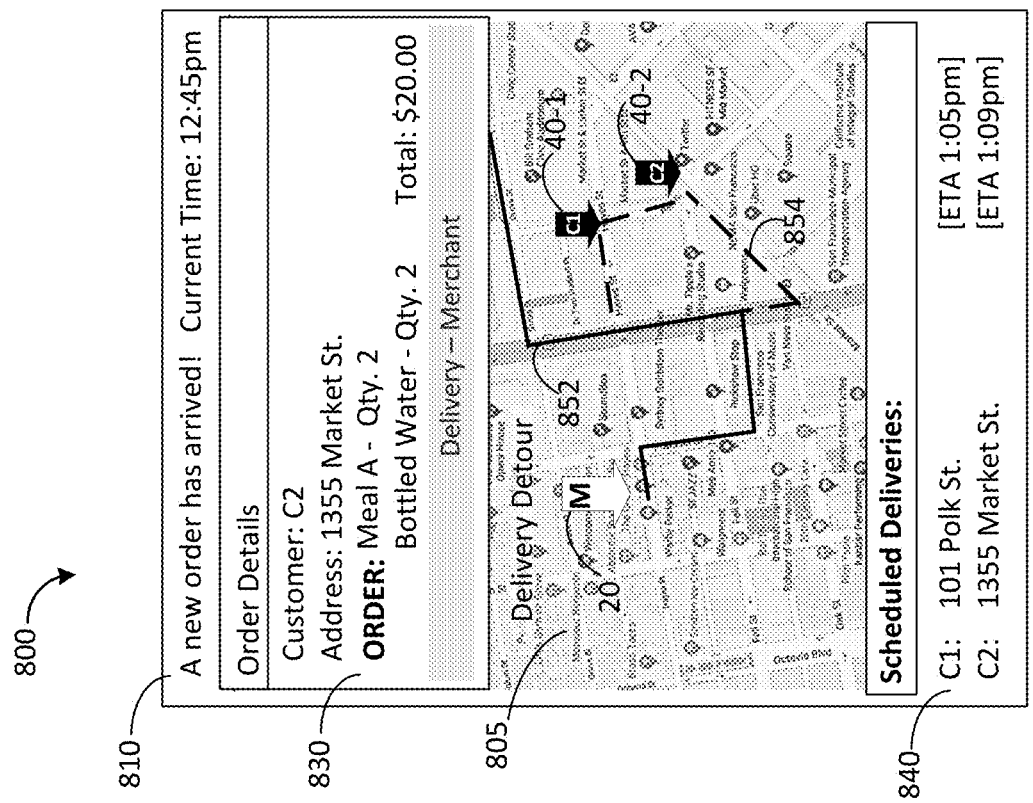
FIG. 8B illustrates a merchant-facing graphical user interface for planning a delivery fulfillment option for an order placed with the merchant in accordance with some embodiments of the present disclosure.
Figure 8A:
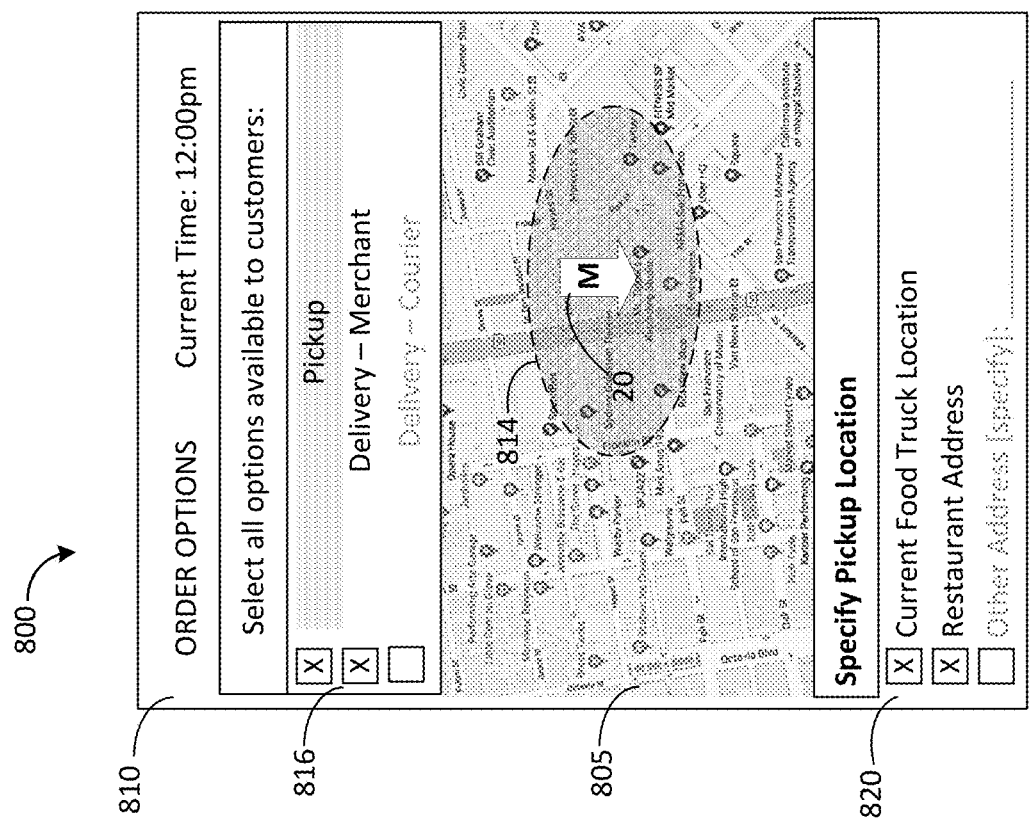
FIG. 8A illustrates a merchant-facing graphical user interface for selecting fulfillment options for orders placed with the merchant in accordance with some embodiments of the present disclosure.

FIGS. 8A and 8B depict exemplary merchant-facing graphical user interfaces 800 for selecting fulfillment options for orders placed with the merchant, in accordance with some embodiments of the present disclosure. Header region 810 indicates that the displayed screen is one through which the merchant can select the fulfillment options that they wish to make available to customers. Header region 810 also includes an indicator of the current time, which is shown to be 12:00 pm. GUI 800 also includes a map region 805 that displays the current location (based on, e.g., GPS data) of the customer device 40. The locations of the merchant device may change in real-time based on updated location information transmitted from the device to the fulfillment server 50. While the GUI 800 uses arrows to display the locations, other embodiments may use any graphical or non-graphical (e.g., text-based) representation.

In some examples where the GUI 800 allows for the selection of the merchant's fulfillment options, the merchant may select such options with reference to a particular geographic area, shown on the map as a region 814. In the exemplary embodiment of FIG. 8A, the operator of the merchant device (also referred to as the merchant) may, through manipulation of the dotted line, change the size or shape of the region 814 for which he intends to specify fulfillment options, however, in other embodiments, the size and/or shape of the region 814 may be predetermined. Once the region 814 is selected, the merchant may, in region 816 of GUI 800 select one or more options for fulfillment. In the illustration of FIG. 8A, the merchant has selected pickup and delivery the merchant as the potential fulfillment options. Upon selection of any particular fulfillment option in region 816, the merchant may, in some embodiments, also be able to specify in region 820, with greater granularity, information about a selected fulfillment option. For instance, with reference to the pickup option in region 816, the merchant may, in region 820, select one or more pickup locations, for instance, pickup at the mobile merchant (food truck) location, specified by the location of merchant device 20, or pickup at the merchant's restaurant address, a brick and mortar location. In some embodiments, a merchant may perform this manipulation and selection for multiple differently located/sized/shaped regions 814.

In some implementations, the GUI 800 may receive notifications, e.g., in field 810 or another location on the GUI, to alert the merchant of specific customers that may have entered the merchant's preferred boundary. In some embodiments, the merchant may create a list of preferred customers, e.g., based on past purchases, proximity detection, etc., to entice the customer to make certain purchases. In some embodiments, the merchant, in response to such notifications, may send a coupon to the customer through the fulfillment platform 50.

FIG. 8B illustrates a GUI 800 displayed to a merchant in support of one of more fulfillment options via delivery by the mobile merchant. As indicated by the header region 810, the displayed GUI is shown to the merchant upon receipt of a new order from a customer, the details of the order being displayed in order region 830. As mentioned with respect to FIG. 8A, the customer may be encouraged to participate in the ordering flow through merchant-initiated coupons and other kinds of outreach. In some examples, when a certain criterion is met (e.g., merchant and customer are within a preferred region), an order may automatically be placed on behalf of the customer without customer intervention. Among other information, such as price, and an itemization of the ordered products, the order region 830 also confirms the method of fulfillment, which is in the exemplary embodiment a delivery by the merchant. The bottom region 840 shows the pending orders that the merchant has yet to fulfill. The order displayed in the order region 830 is listed in region 840 under the entry for customer C2, while an earlier placed order is listed under the entry for customer C1 (delivery at a different address from customer C2). In one embodiment, the orders are added sequentially to the list in the bottom region 840, however, in other embodiments, fulfillment server 50 may optimize a delivery order based on one or more of: customer distance from the merchant's current location, estimated delivery time conveyed to customer, customer order (e.g., to group together orders of the same product to expedite preparation), based on traffic conditions, or any other factors. Map region 805 of FIG. 8B illustrates the merchant's planned route 852 (shown as a solid line) and the detour 854 necessitated by the incoming delivery to customer C2 (shown as a dotted line). In some embodiments, the merchant may alter its planned route and/or the detour route to accommodate the deliveries and/or any changes to their route.

Figure 9:
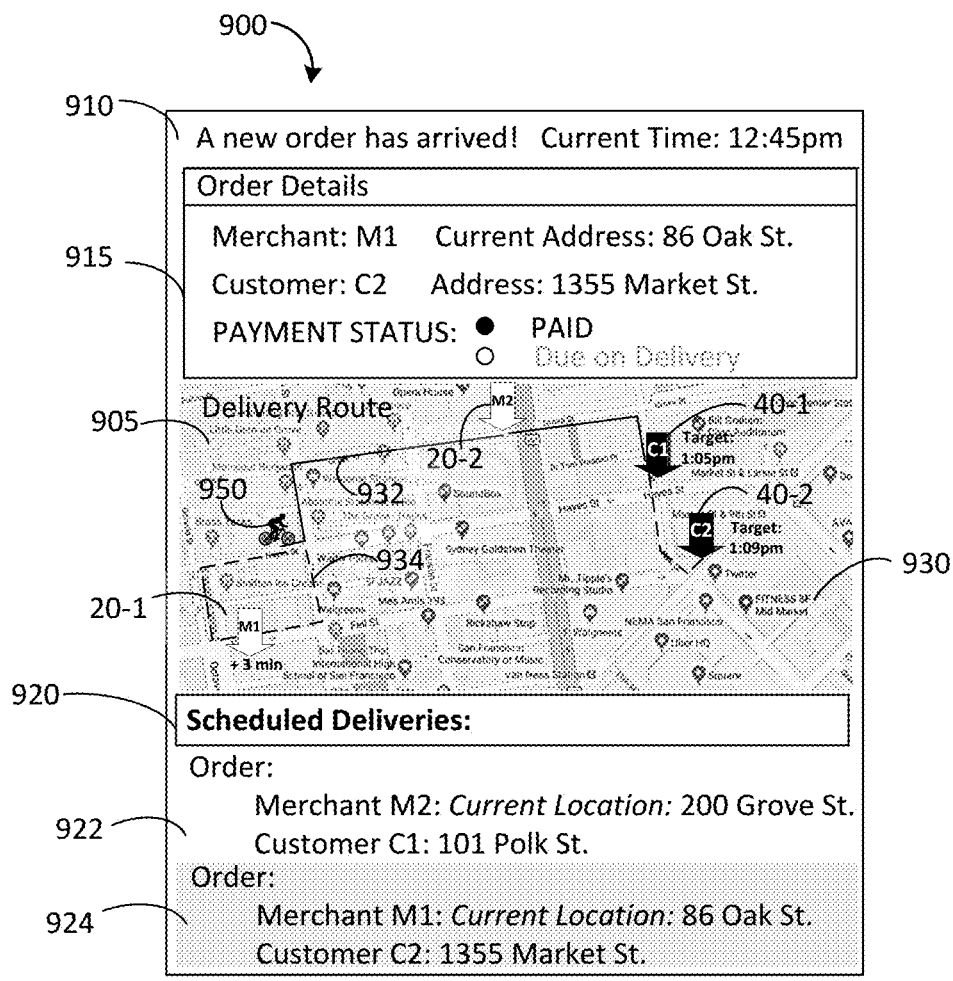
FIG. 9 illustrates a courier-facing graphical user interface for planning a delivery fulfillment option by a courier for an order placed with a merchant in accordance with some embodiments of the present disclosure.

FIG. 9 depicts a courier-facing graphical user interface for planning a delivery fulfillment option by a courier for an order placed with a merchant in accordance with some embodiments of the present disclosure. GUI 900 presents information that might appear on a display screen of a courier device (e.g., a smartphone or other device) when using a courier-facing user interface. GUI 900 indicates, in the header region 910, that the courier has been assigned delivery to a customer. Header region 910 also includes an indication of the current time. Order region 915 sets out the details of the order, including, the current location of the merchant M1 (i.e., the pickup location), the current location of the customer C2 (i.e., the drop off location), and a payment status of the order, indicating whether the courier must obtain payment upon delivery. The bottom region 920 shows the pending orders that the courier has yet to deliver. The order displayed in the order region 915 is listed as "Order 2" (item 924), while an earlier placed order (between Merchant M2 and customer C1) is listed as "Order 1" (item 922). In one embodiment, the orders are added sequentially to the list in bottom region 920, however, in other embodiments, fulfillment server 50 may optimize a delivery order based on one or more of: customer distance from the courier's current location, estimated delivered time conveyed to customer, traffic conditions, or any other factors. A map region 905 displays the current location (based on, e.g., GPS data) of the merchant device 20-2 associated with Merchant M2 and the customer device 40-1 associated with customer C1 (the merchant/customer of Order 1), as well as the current location of the merchant device 20-1 associated with Merchant M1 and the customer device 40-2 associated with customer C2 (the merchant/customer of Order 2). The locations of the customer devices and the merchant devices may change in real-time based on updated location information transmitted from the devices 20, 40 to the fulfillment server 50. Map region 905 illustrates the courier's initial planned route 932 (shown as a solid line) based on their first order and the added, changed, or otherwise modified route 934 (shown as a dotted line) necessitated by the incoming Order 2. In some embodiments, the courier may alter the planned route 932 and/or the modified route to accommodate the deliveries and/or any changes to their route.

Figure 10:
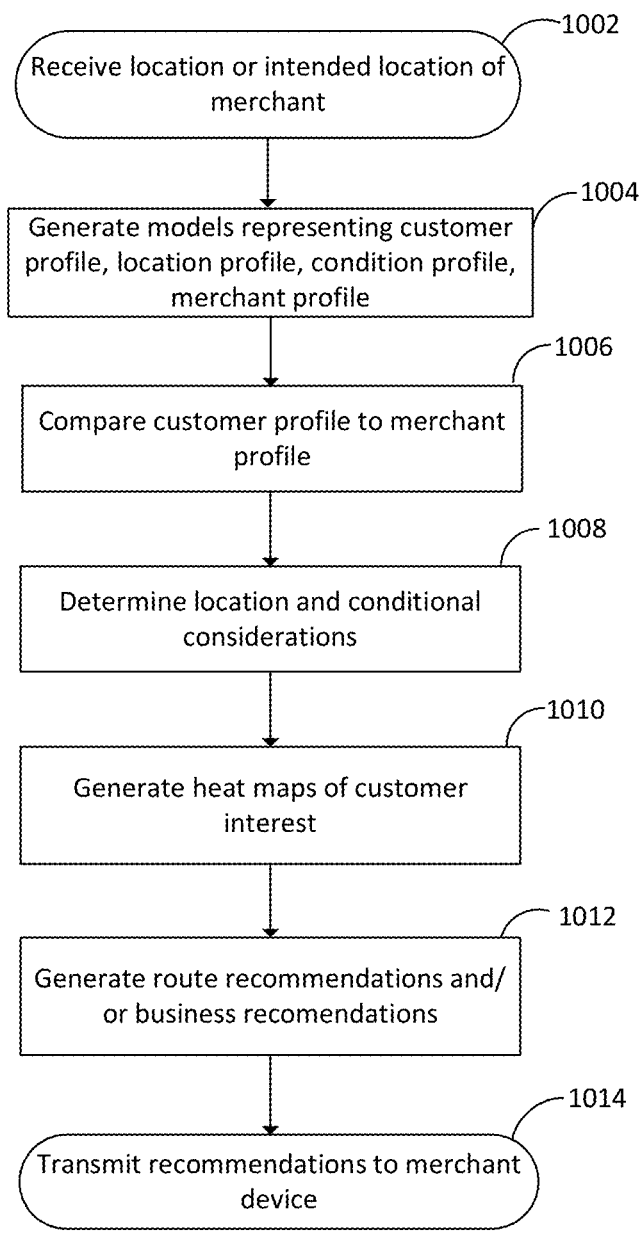
FIG. 10 is a flow chart of a process for dynamically providing a merchant recommendation by a fulfillment server in accordance with some embodiments of the present disclosure.

FIG. 10 is a flowchart illustrating an exemplary process for using profile information, such as customer profile information, to provide route recommendations to a merchant according to some implementations. FIG. 10 references, for purposes of example, components discussed above with respect to FIGS. 1-5. Regarding the processes 1002-1014, while the various steps, blocks, or sub-processes are presented in a given order, alternative embodiments can perform routines having steps, or employ systems having steps, blocks, or sub-processes, in a different order, and some steps, sub-processes or blocks can be deleted, moved, added, subdivided, combined, and/or modified to provide alternative or sub-combinations. Each of these steps, blocks, or sub-processes can be implemented in a variety of different ways. Also, while steps, sub-processes, or blocks are at times shown as being performed in series, some steps, sub-processes or blocks can instead be performed in parallel, or can be performed at different times as will be recognized by a person of ordinary skill in the art. Further, any specific numbers noted herein are only examples; alternative implementations can employ differing values or ranges.

In step 1002, location or intended location of the merchant is received. For example, the merchant recommendation logic 322 receives an actual or intended location at which a merchant intends to conduct business. This location information may be transmitted, in the case of actual location, from a merchant's location-communicating component 32, e.g., from a GPS component, or, in the case of an intended location, from a route plan either conveyed by the merchant device 20 to the fulfillment server 50, e.g., via merchant-facing user interface 54, or stored at the fulfillment server 50.

In step 1004, models are generated based on and representing customer profile, location profile, condition profile, merchant profile, etc. For example, the merchant recommendation logic 322 applies predictive analysis (in some embodiments, prior to the transmission of a notification of proximity) to generate models representing information regarding: the customers and/or their predicted interest in the merchant and its products (one or more customer profiles); selected locations (one or more location profiles); current conditions (one or more current condition profiles); and the merchant(s) themselves (one or more merchant profiles). Accordingly, the merchant recommendation logic 322 may further analyze results from the models to generate location, route, and/or product recommendations to the merchant. The merchant profiles and customer profiles are stored in a manner such that a customer device does not have access to the merchant profile and vice versa, without the intervention of the fulfillment processor. In this manner, the fulfillment processor provides context-specific filtering.

In step 1006, the customer profile is compared to the merchant profile. For example, the merchant recommendation logic 322 compares customer profiles to merchant profiles, both in the merchant location and/or in one or more other area locations, to determine the geographic areas in which predicted customer intent is highest. In an exemplary embodiment, predicted customer intent may be based on a transmission of one or more interest inquiries to area customers, and a measurement or aggregation of interest indicators received from customers (as described above, for example, with regard to FIG. 6A). In other embodiments, predicted customer intent may be determined based on any appropriate measurement or inquiry from customers, such as a consideration of aggregated information regarding customers in different locations (such as a number of items purchased by date/time/product/location/etc.), a number of unique orders by different customers, a total amount spent by customers in an area (or of profit received by the merchant). In still other embodiments, the fulfillment server 50 may consider interactions of customers with the merchant, such as through a number or type of interactions of those customers with a merchant's app or website, or a mention of or interaction with a merchant (or of a merchant's products) through social media. Other indicators of customer intent are possible in other embodiments.

The result of this comparison may be used to generate a heat map of customer interest, from which a route for the merchant may be planned. More particularly, in step 1008, merchant recommendation logic 322 uses the one or more location profile(s) and the current condition profile(s) to identify any additional considerations that should be evaluated in the condition of the merchant's route. This may include, for example, weather patterns, seasonal patterns, traffic patterns, events, local rules, and the like. If merchant recommendation logic 322 recognizes any relevant considerations that may impact or alter the intended route of the merchant, such considerations may be incorporated or noted on the heat maps generated in step 1010. Conditional information considered in these determinations may include, e.g., current and historic conditions, such as current time and date, weather, traffic patterns, area events and business, local regulations and zoning, landmarks, buildings, addresses, transit delays, road closures, and other information that may impact both customer and merchant likelihood or willingness to visit a particular location. Accordingly, Steps 1008 and 1010 may result in the creation of one or more heat maps, lists, dashboards, or other information guidance reflecting areas of high customer interest and/or expected high sales volume that, in consideration of known factors of the area locations, and real-time considerations, will still be efficient and practicable for the merchant to visit and conduct business. This information may be transmitted to the merchant device 20 in step 814 via a merchant-facing user interface 54.

In Step 1012, the heat maps may be used to generate route recommendations to a merchant device 20. As one example, merchant recommendation logic 322 may automatically generate a suggested geographic location for the merchant, e.g., the geographic location with the most concentration of interest. In some embodiments, in step 1012, in addition to or in the alternate to a route recommendation, the merchant recommendation logic 322 may analyze information regarding the customers in a geographic area, their predicted interest in the merchant, and/or the merchant's current product offerings and/or inventory so as to generate a recommendation to the merchant to effect the optimization of their business. Any recommendations, such as suggested locations, may be transmitted to the merchant device in step 1014. The recommendations may be displayed, for instance, as part of a dedicated app installed on a merchant device or on a website visited by the merchant via a web browser or other application. However, in alternate embodiments, any graphical or text-based communication (or a combination thereof) may be sent to the merchant device, such as email, instant messaging, or other type of electronic communication, or via voice, SMS, voicemail, or any other appropriate type of communication. In some embodiments, rather than a recommendation the merchant's route may be automatically changed, or restrictions may be placed thereon, in accordance with the data indicated by the customer heat maps.

In some embodiments, a recommended route may be presented to the merchant in the form of a map (or a graphical representation similar to a map), in which a path to different customers or locations is indicated. The particular order of customers or locations on the path set out by the map may be based on, for instance, a distance from the merchant, a measurement of customer loyalty (such as number of items purchased, number of unique orders, total amount spent, interaction with the merchant through merchant app/website/social media or the like, or any other measurement), optimization based on traffic, weather, or street conditions, the merchant's particular inventory in relation to specialized areas of customer interest in particular items sold by the merchant, or any other appropriate measurement. In other embodiments, rather than a map, an ordered or ranked list of target areas or customers may be transmitted to the merchant device, or, in some instances, a single target "next" area, based on the merchant's current location and the area in which the fulfillment server determines to be the next stop on the calculated route. In some embodiments, any recommendations may be pushed to a merchant device, at any point before or during the merchant's progression on a route of travel, or may be delivered to the merchant device upon the merchant's request (e.g., through interaction with a dedicated app or web site, text or phone call by the merchant, or any other known method of communication.

In embodiments where the generated recommendation information is sent in advance of the merchant reaching the desired location at which they intend to conduct business, the merchant recommendation logic 322's business recommendations may be used to optimize its business practice. For instance, in an embodiment where the merchant is aware of a growing or high demand for a certain type of product, the merchant may increase its supply of that product prior to beginning its route. In the case of a merchant food truck that receives a recommendation of predicted orders (or, where a proximity notification has been sent out, actual orders), the food truck may begin preparing these orders immediately upon arriving at their designating location, thereby leading to more efficient food production.

Through the application of the systems and methods described herein and set forth in FIGS. 1-10, customers may receive targeted recommendations based on their proximity to merchants of interest (or merchants offering products of interest) without having to perform extensive search or filtering of merchant's and/or their products. Further, the systems described herein expedite a fulfillment process by dynamically determining which of several fulfillment options (e.g., pickup, delivery, both) may apply given a changeable proximity between the merchant and the customer (e.g., a moving food truck and/or a moving person), the availability of additional, transient fulfillment options such as couriers, the current conditions that may limit the merchant's ability to fulfill certain orders or to provide certain mechanisms for fulfillment, or other limiting factors. Still further, valuable intelligence about customer interest and historical and predictive customer and merchant profiles can be used to plan and optimize a mobile merchant's route of sale, inventory, and fulfillment management, thereby optimizing the merchant's profit.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method, comprising:
   determining, by at least one server, a merchant location at which a merchant is positioned;
   determining, by the server, a user location at which a user is positioned based, at least in part, on a location of a client device operated by the user;
   identifying, by the server, a boundary range surrounding the merchant location from two or more boundary ranges based, at least in part, on the user location;
   identifying, by the server, a set of fulfillment options that corresponds to the identified boundary range, the set of fulfillment options including one or more of: a pickup option or a delivery option;
   dynamically generating, by the server and based, at least in part, on the identified set of fulfillment options, a first point-of-sale interface, wherein the first point-of-sale interface (a) facilitates user input pertaining to an order from the merchant, and (b) presents the identified set of fulfillment options for fulfillment of the order;
providing to the client device, by the server, the first point-of-sale interface;
after providing the first point-of-sale interface to the client device, determining, by the server, an update to the merchant location;
identifying, by the server, a second boundary range surrounding the updated merchant location,
determining, by the server, that the user location is within the identified second boundary range;
identifying, by the server, a second set of fulfillment options that corresponds to the identified second boundary range, the first set of fulfillment options being different from the second set of fulfillment options;
dynamically generating, by the server and based, at least in part, on the identified second set of fulfillment options, a second point-of-sale interface, wherein the second point-of-sale interface presents the identified second set of fulfillment options and facilitates user input pertaining to an order from the merchant; and
providing to the client device, by the server, the second point-of-sale interface.

2. The method as recited in claim 1, wherein identifying the boundary range surrounding the merchant location from two or more boundary ranges is further performed based, at least in part, on one or more of: 1) one or more traffic conditions, 2) one or more weather conditions, or 3) time of day.

3. The method as recited in claim 1,
the second set of fulfillment options including one or more of: a pickup option or a delivery option.

4. The method as recited in claim 1, the set of fulfillment options not including a pickup option.

5. The method as recited in claim 1, the set of fulfillment options not including a delivery option.

6. The method as recited in claim 1, further comprising:
determining the merchant location based, at least in part, on a location of a client device operated by the merchant.

7. The method as recited in claim 1, further comprising:
determining, by the server, a distance between the merchant location and the user location;
wherein identifying the boundary range is performed based, at least in part, on the distance between the merchant location and the user location.

8. A system, comprising:
at least one processor configurable to cause:
determining, by at least one server, a merchant location at which a merchant is positioned;
determining, by the server, a user location at which a user is positioned based, at least in part, on a location of a client device operated by the user;
identifying, by the server, a boundary range surrounding the merchant location from two or more boundary ranges based, at least in part, on the user location;
identifying, by the server, a set of fulfillment options that corresponds to the identified boundary range, the set of fulfillment options including one or more of: a pickup option or a delivery option;
dynamically generating, by the server and based, at least in part, on the identified set of fulfillment options, a first point-of-sale interface, wherein the first point-of-sale interface (a) facilitates user input pertaining to an order from the merchant, and (b) presents the identified set of fulfillment options for fulfillment of the order;
providing to the client device, by the server, the first point-of-sale interface;
after providing the first point-of-sale interface to the client device, determining, by the server, an update to the merchant location;
identifying, by the server, a second boundary range surrounding the updated merchant location,
determining, by the server, that the user location is within the identified second boundary range;
identifying, by the server, a second set of fulfillment options that corresponds to the identified second boundary range, the first set of fulfillment options being different from the second set of fulfillment options;
dynamically generating, by the server and based, at least in part, on the identified second set of fulfillment options, a second point-of-sale interface, wherein the second point-of-sale interface presents the identified second set of fulfillment options and facilitates user input pertaining to an order from the merchant; and
providing to the client device, by the server, the second point-of-sale interface.

9. The system as recited in claim 8, wherein identifying the boundary range surrounding the merchant location from two or more boundary ranges is further performed based, at least in part, on one or more of: 1) one or more traffic conditions, 2) one or more weather conditions, or 3) time of day.

10. The system as recited in claim 8,
the second set of fulfillment options including one or more of: a pickup option or a delivery option.

11. The system as recited in claim 8, the set of fulfillment options not including a pickup option.

12. The system as recited in claim 8, the set of fulfillment options not including a delivery option.

13. The system as recited in claim 8, the processor further configurable to cause:
determining the merchant location based, at least in part, on a location of a client device operated by the merchant.

14. The system as recited in claim 8, the processor further configurable to cause:
determining, by the server, a distance between the merchant location and the user location;
wherein identifying the boundary range is performed based, at least in part, on the distance between the merchant location and the user location.

15. A computer program product comprising computer-readable program code capable of being executed by one or more processors when retrieved from a non-transitory computer-readable medium, the program code comprising computer-readable instructions configurable to cause:
determining, by at least one server, a merchant location at which a merchant is positioned;
determining, by the server, a user location at which a user is positioned based, at least in part, on a location of a client device operated by the user;
identifying, by the server, a boundary range surrounding the merchant location from two or more boundary ranges based, at least in part, on the user location;
identifying, by the server, a set of fulfillment options that corresponds to the identified boundary range, the set of fulfillment options including one or more of: a pickup option or a delivery option;
dynamically generating, by the server and based, at least in part, on the identified set of fulfillment options, a first point-of-sale interface, wherein the first point-of-sale interface (a) facilitates user input pertaining to an order from the merchant, and (b) presents the identified set of fulfillment options for fulfillment of the order;

providing to the client device, by the server, the first point-of-sale interface;

after providing the first point-of-sale interface to the client device, determining, by the server, an update to the merchant location;

identifying, by the server, a second boundary range surrounding the updated merchant location, determining, by the server, that the user location is within the identified second boundary range;

identifying, by the server, a second set of fulfillment options that corresponds to the identified second boundary range, the first set of fulfillment options being different from the second set of fulfillment options;

dynamically generating, by the server and based, at least in part, on the identified second set of fulfillment options, a second point-of-sale interface, wherein the second point-of-sale interface presents the identified second set of fulfillment options and facilitates user input pertaining to an order from the merchant; and providing to the client device, by the server, the second point-of-sale interface.

16. The computer program product as recited in claim 15, wherein identifying the boundary range surrounding the merchant location from two or more boundary ranges is further performed based, at least in part, on one or more of: 1) one or more traffic conditions, 2) one or more weather conditions, or 3) time of day.

17. The computer program product as recited in claim 15, the second set of fulfillment options including one or more of: a pickup option or a delivery option.

18. The computer program product as recited in claim 15, the set of fulfillment options not including a delivery option.

19. The computer program product as recited in claim 15, the program code comprising computer-readable instructions further configurable to cause:

determining the merchant location based, at least in part, on a location of a client device operated by the merchant.

20. The computer program product as recited in claim 15, the program code comprising computer-readable instructions further configurable to cause:

determining, by the server, a distance between the merchant location and the user location;

wherein identifying the boundary range is performed based, at least in part, on the distance between the merchant location and the user location.

* * * * *